US009891825B2

(12) United States Patent
Nango et al.

(10) Patent No.: US 9,891,825 B2
(45) Date of Patent: Feb. 13, 2018

(54) MEMORY SYSTEM OF INCREASING AND DECREASING FIRST USER CAPACITY THAT IS SMALLER THAN A SECOND PHYSICAL CAPACITY

(71) Applicant: Toshiba Memory Corporation, Minato-Ku, Tokyo (JP)

(72) Inventors: Takahiro Nango, Tokyo (JP); Yoshihisa Kojima, Kanagawa (JP); Tohru Fukuda, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 216 days.

(21) Appl. No.: 14/852,182

(22) Filed: Sep. 11, 2015

(65) Prior Publication Data

US 2016/0216894 A1   Jul. 28, 2016

Related U.S. Application Data

(60) Provisional application No. 62/106,989, filed on Jan. 23, 2015.

(51) Int. Cl.

| G06F 12/00 | (2006.01) |
|---|---|
| G06F 13/00 | (2006.01) |
| G06F 13/28 | (2006.01) |
| G06F 9/26 | (2006.01) |
| G06F 9/34 | (2006.01) |
| G06F 3/06 | (2006.01) |
| G06F 12/02 | (2006.01) |
| G06F 12/1036 | (2016.01) |
| G06F 12/109 | (2016.01) |

(52) U.S. Cl.
CPC ............ *G06F 3/0604* (2013.01); *G06F 3/064* (2013.01); *G06F 3/0679* (2013.01); *G06F 12/0284* (2013.01); *G06F 3/0644* (2013.01); *G06F 12/0292* (2013.01); *G06F 12/109* (2013.01); *G06F 12/1036* (2013.01)

(58) Field of Classification Search
CPC ...... G06F 3/064; G06F 3/0644; G06F 3/0604; G06F 3/0679; G06F 12/0284; G06F 12/0292; G06F 12/1036; G06F 12/109
USPC .................. 711/171, 129, 153, 173, 206, 209
See application file for complete search history.

(56) References Cited

U.S. PATENT DOCUMENTS

| 2012/0215965 A1 | 8/2012 | Inada et al. |
|---|---|---|
| 2013/0227246 A1 | 8/2013 | Hiroa et al. |

(Continued)

FOREIGN PATENT DOCUMENTS

| JP | 2012-128545 A | 7/2012 |
|---|---|---|
| JP | 2012-174086 A | 9/2012 |
| JP | 2013-149112 A | 8/2013 |

(Continued)

*Primary Examiner* — Yaima Rigol
*Assistant Examiner* — Shane Woolwine
(74) *Attorney, Agent, or Firm* — White & Case LLP

(57) ABSTRACT

According to one embodiment, a memory system includes a first storage area and a controller. The first storage area configured to store therein data sent from a host. The size of the first storage area is a first size larger than a second size. The second size is a size of a logical address space which is assigned to a memory system by the host. The controller is configured to change the second size in response to a request from the host while at least a part of data in the logical address space stays valid.

15 Claims, 27 Drawing Sheets

(56) References Cited

U.S. PATENT DOCUMENTS

2014/0281126 A1* 9/2014 Bleyer .................... G06F 3/061
                                                              711/103
2016/0062662 A1* 3/2016 Samuels ............. G06F 12/0246
                                                              711/103

FOREIGN PATENT DOCUMENTS

| JP | 2013-200741 A | 10/2013 |
| JP | 2013-206307 A | 10/2013 |

* cited by examiner

FIG.11

PHYSICAL BLOCK INFORMATION
301

| LOGICAL BLOCK NUMBER, CHANNEL NUMBER, BANK NUMBER, PLANE NUMBER | PHYSICAL BLOCK NUMBER |
|---|---|
| LOGICAL BLOCK NUMBER, CHANNEL NUMBER, BANK NUMBER, PLANE NUMBER | PHYSICAL BLOCK NUMBER |
| ⋮ | ⋮ |

FIG.12

LUT BLOCK INFORMATION
302

| LUT BLOCK ID | LOGICAL BLOCK NUMBER |
|---|---|
| LUT BLOCK ID | LOGICAL BLOCK NUMBER |
| ⋮ | ⋮ |

LUT ACTIVE BLOCK LIST
303

| LUT BLOCK ID |
| LUT BLOCK ID |
| ⋮ |
| LUT BLOCK ID |
| LUT BLOCK ID |

↓ Time

FIRST CLUSTER COUNTER
304

| LOGICAL BLOCK NUMBER | THE NUMBER OF VALID CLUSTERS |
|---|---|
| LOGICAL BLOCK NUMBER | THE NUMBER OF VALID CLUSTERS |
| ⋮ | ⋮ |

FIG.15

UNMAP RESERVATION TABLE
307

| REGION NUMBER | SECOND FLAG |
|---|---|
| 0 | 0 |
| 1 | 0 |
| 2 | 0 |
| 3 | 1 |
| ⋮ | ⋮ |
| L | 0 |

FIG.16

REVERSE TABLE
311

| LUT BLOCK ID | REGION NUMBER |
|---|---|
| 0 | 223, ……, 551 |
| 1 | 132343, ……, 23 |
| ⋮ | ⋮ |
| N | 4332, ……, 123 |

SECOND CLUSTER COUNTER
315

| REGION #0 TO REGION #1023 | THE NUMBER OF CLUSTERS IN NON-UNMAP STATE |
|---|---|
| REGION #1024 TO REGION #2047 | THE NUMBER OF CLUSTERS IN NON-UNMAP STATE |
| ⋮ | ⋮ |

# MEMORY SYSTEM OF INCREASING AND DECREASING FIRST USER CAPACITY THAT IS SMALLER THAN A SECOND PHYSICAL CAPACITY

CROSS-REFERENCE TO RELATED APPLICATIONS

This application is based upon and claims the benefit of priority from U.S. Provisional Application No. 62/106,989, filed on Jan. 23, 2015; the entire contents of which are incorporated herein by reference.

FIELD

Embodiments described herein relate generally to a memory system.

BACKGROUND

Conventionally, a host can write user data in a memory system which has a size of a user capacity of the memory system as an upper limit. A physical capacity of the memory system is larger than the user capacity. The memory system allocates a storage area having the size of the user capacity in a storage area having the size of the physical capacity.

BRIEF DESCRIPTION OF THE DRAWINGS

FIG. 11 is a diagram illustrating an exemplary data structure of physical block information;
FIG. 12 is a diagram illustrating an exemplary data structure of LUT block information;
FIG. 15 is a diagram illustrating an exemplary data structure of a reservation table;
FIG. 16 is a diagram illustrating an exemplary data structure of a reverse table (reverse LUT)

DETAILED DESCRIPTION

In general, according to one embodiment, a memory system includes a first storage area and a controller. The first storage area configured to store therein data sent from a host. The size of the first storage area is a first size larger than a second size. The second size is a size of a logical address space which is assigned to a memory system by the host. The controller is configured to change the second size in response to a request from the host while at least a part of data in the logical address space stays valid.

Exemplary embodiments of a memory system will be explained below in detail with reference to the accompanying drawings. The present invention is not limited to the following embodiments.

(First Embodiment)

Figure 1:
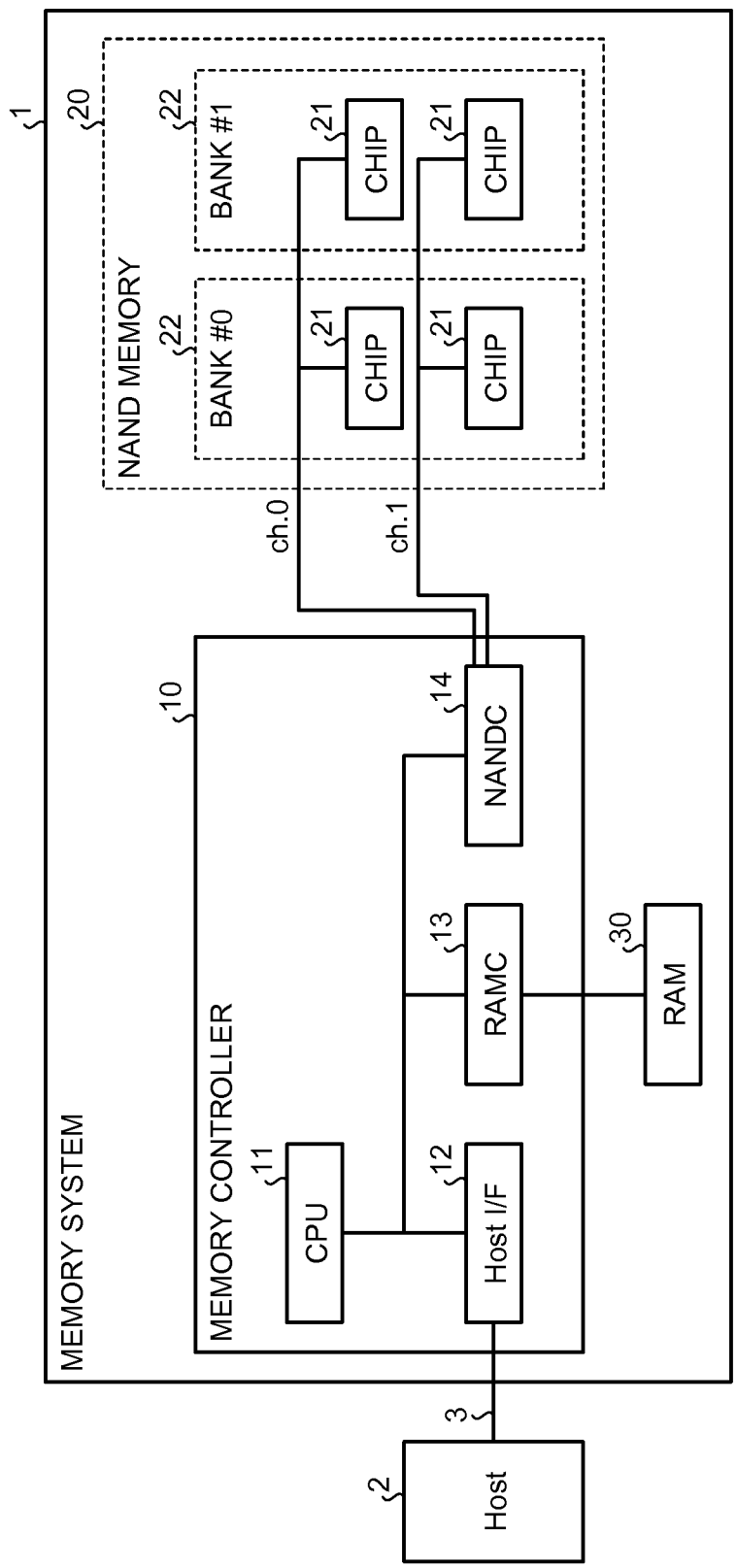
FIG. 1 is a diagram illustrating an exemplary configuration of a memory system of a first embodiment.

FIG. 1 is a diagram illustrating an exemplary configuration of the memory system of a first embodiment. A memory system 1 is connected to a host 2 through a communication channel 3. The host 2 is a computer. The computer, for example, includes a personal computer, a portable computer, or a portable communication device. The memory system 1 serves as an external memory apparatus of the host 2. As an interface standard of the communication channel 3, any interface standard may be employed. The host 2 can issue an access request (a write request and a read request), and an UNMAP request to the memory system 1. The access request and the UNMAP request are configured to include logical address information (hereinafter, referred to as a "first address"). The UNMAP request will be described below. A size of the logical address space (that is, a range in which a location can be designated in the memory system 1 by the first address) which is used by the host 2 with respect to the memory system 1 is the same as a user capacity of the memory system 1.

The memory system 1 includes a memory controller 10, a NAND flash memory (a NAND memory) 20, a random access memory (RAM) 30. The NAND memory 20 is used as a storage. Further, a type of a memory used as the storage is not limited only to the NAND flash memory. For example, a NOR flash memory, a resistance random access memory (ReRAM), a magnetoresistive random access memory (MRAM), or the like may be employed as the storage.

The NAND memory 20 is composed of one or more memory chips (CHIP) 21. Herein, the NAND memory 20 includes four memory chips 21.

Figure 2:
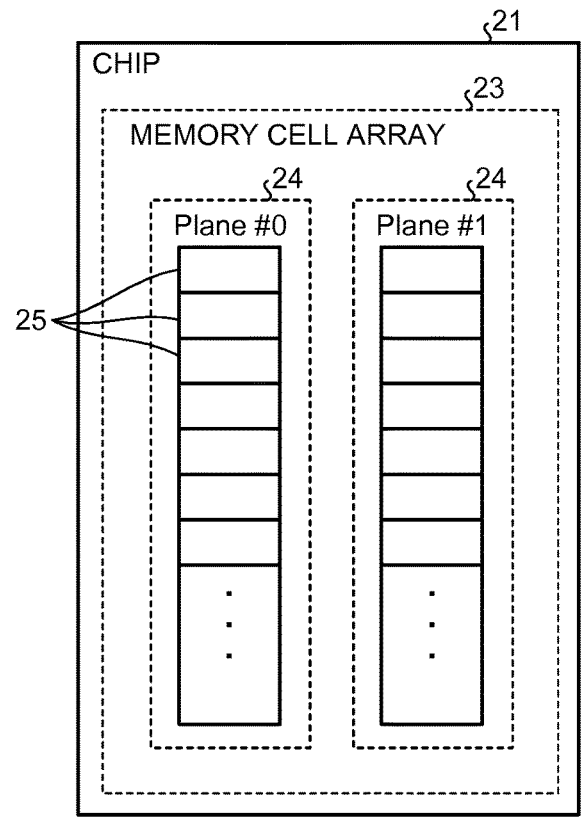
FIG. 2 is a diagram illustrating an exemplary configuration of each memory chip.

FIG. 2 is a diagram illustrating an exemplary configuration of each memory chip 21. Each memory chip 21 includes a memory cell array 23. The memory cell array 23 is configured such that a plurality of memory cells are disposed in a matrix manner. The memory cell array 23 is divided into two districts 24. Each district 24 includes a plurality of physical blocks 25. Each district 24 includes peripheral circuits (for example, a row decoder, a column decoder, a page buffer, a data cache, and the like) which independently operate from each other, so that access (erase, program, and read) can be simultaneously made to a plurality of districts 24. The program is an operation of injecting electric charges corresponding to data into a memory cell in the physical block 25 at a program destination. Four districts 24 in each memory chip 21 each are specified with a plane number (Plane #0, Plane #1). Further, the number of districts 24 included in each memory chip 21 may also be any number instead of "2".

Figure 3:
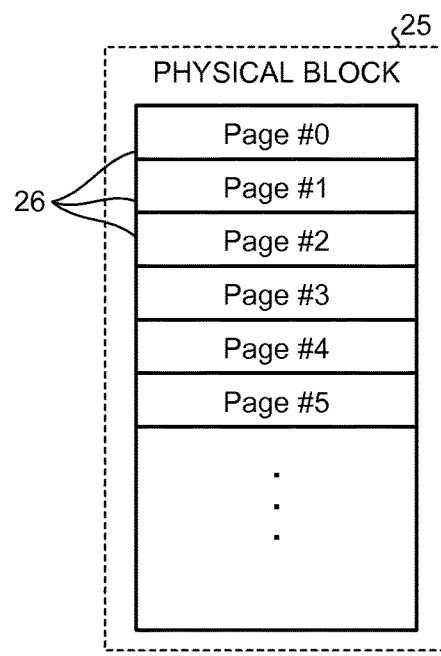
FIG. 3 is a diagram illustrating an exemplary configuration of each physical block.

The physical block 25 is a unit of erase in each district 24. FIG. 3 is a diagram illustrating an exemplary configuration of each physical block 25. Each physical block 25 is configured to include a plurality of physical pages. A physical page 26 is a unit of program and read in each district 24. Each physical page 26 is identified by a page number.

Four memory chips 21 included in the NAND memory 20 each are connected to the memory controller 10 through any one of two channels (ch. 0 to ch. 3). Herein, two memory chips 21 are connected to each channel. Each memory chip 21 is connected to one of the two channels. Each channel is composed of a wiring group including an I/O signal line and a control signal line. The I/O signal line is a signal line for transmitting or receiving data, an address, and a command. Further, a bit width of the I/O signal line is not limited to 1 bit. The control signal line is a signal line for transmitting and receiving a WE (write enable) signal, an RE (read enable) signal, a CLE (command latch enable) signal, an ALE (address latch enable) signal, a WP (write protect) signal, and the like. The memory controller 10 can individually make control on each channel. The memory controller 10 can simultaneously operate any two memory chips 21 each connected to a separate channel by simultaneously and individually making control on the two channels.

In addition, the four memory chips 21 form a plurality of banks 22. With the configuration of the plurality of banks 22, the memory controller 10 can perform a bank interleaving operation. The bank interleaving operation is one of parallel operating schemes. Specifically, the bank interleaving operation is a scheme in which, during a period when one or more memory chips 21 belonging to one bank 22 makes access to data, the memory controller 10 issues an access command to another bank in order to shorten a total processing time between the NAND memory 20 and the memory controller 10. In the example of FIG. 1, the two banks 22 each are distinguished by using separate bank number (BANK #0 and BANK #1). More specifically, one of two memory chips 21 connected to each channel serves as BANK #0, and the other one of the two memory chips 21 serves as BANK #1. Further, the access command includes a program command, a read command, and an erase command.

In this way, the memory controller 10 simultaneously operates two channels, and performs the bank interleaving operation using two banks, so that the four memory chips 21 in total can be operated in parallel. In addition, the memory controller 10 makes access to two districts 24 at the same time with respect to each memory chip 21. The memory controller 10 manages a plurality of physical blocks 25 which are accessible in parallel collectively as one logical block. For example, the plurality of physical blocks 25 constituting a logical block are collectively erased.

Figure 4:
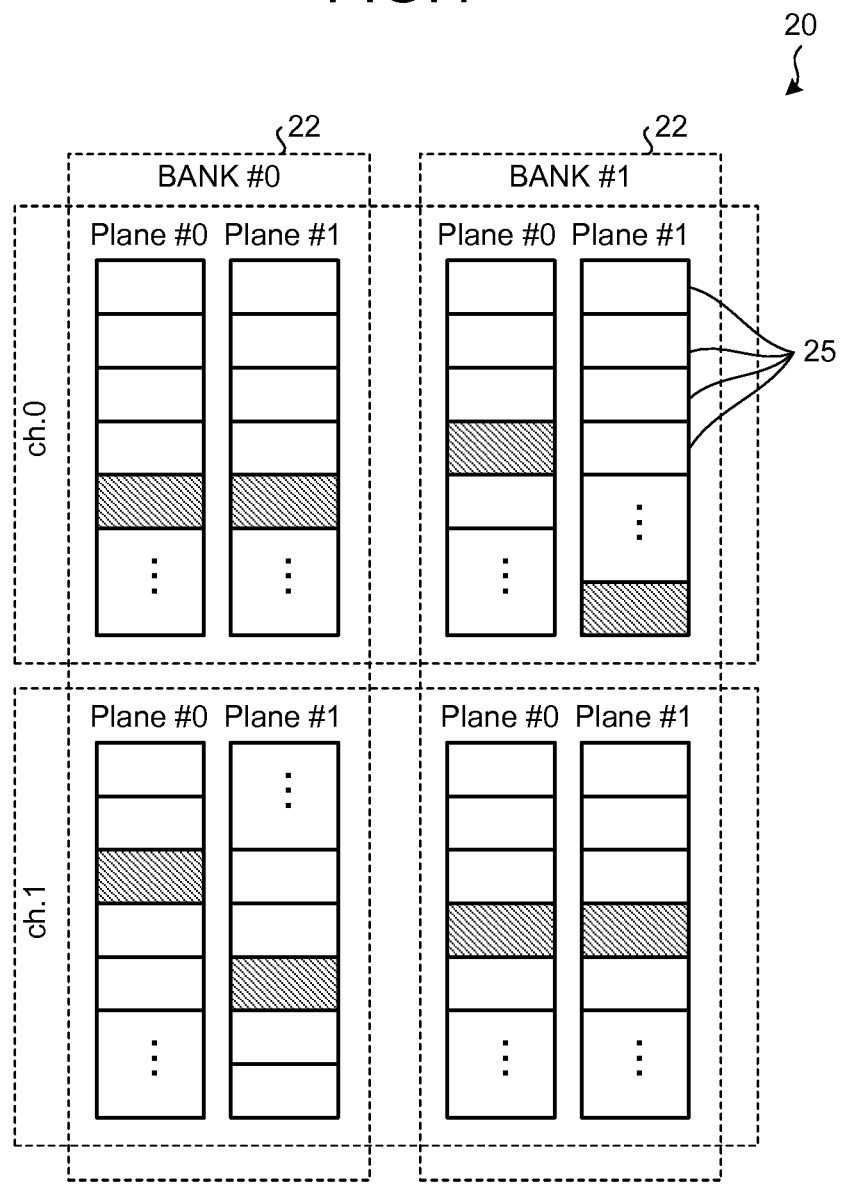
FIG. 4 is a diagram illustrating an exemplary configuration of each logical block.

FIG. 4 is a diagram illustrating an exemplary configuration of each logical block. Herein, one logical block is composed of eight physical blocks 25 of which at least one of a channel number, a bank number, and a plane number is different each other. For example, the plurality of physical blocks 25 hatched in FIG. 4 form one logical block. The physical location of the respective physical blocks 25 forming one logical block may not be uniform in the respective districts 24. Each logical block is assigned with a unique logical block number.

The RAM 30 stores therein various types of information which is necessary for the memory controller 10 to control the NAND memory 20. The details of the various types of information stored in the RAM 30 will be described below. In addition, the RAM 30 is a buffer for data transmission between the host 2 and the NAND memory 20, and is used by the memory controller 10. In addition, the RAM 30 is used as a buffer on which a firmware program (a firmware program 201) is loaded. Further, any type of memory may be employed as the RAM 30. For example, a dynamic random access memory (DRAM), a static random access memory (SRAM), or a combination thereof may be employed as the RAM 30. In addition, any memory operating in a higher speed than the storage can be employed instead of the RAM 30. In addition, the RAM 30 may be configured as one chip together with the memory controller 10.

The memory controller 10 includes a central processing unit (CPU) 11, a host interface (Host I/F) 12, a RAM controller (RAMC) 13, and a NAND controller (NANDC) 14. The CPU 11, a Host I/F 12, the RAMC 13, and the NANDC 14 are connected to each other through a bus.

The Host I/F 12 performs control on the communication channel 3. In addition, the Host I/F 12 receives various requests from the host 2. In addition, the Host I/F 12 performs the data transmission between the host 2 and the RAM 30. The RAMC 13 makes control on the RAM 30. The NANDC 14 performs the data transmission between the RAM 30 and the NAND memory 20. The CPU 11 serves as a processing unit which performs the entire control on the memory controller 10 based on the firmware program 201 loaded on the RAM 30.

Figure 5:
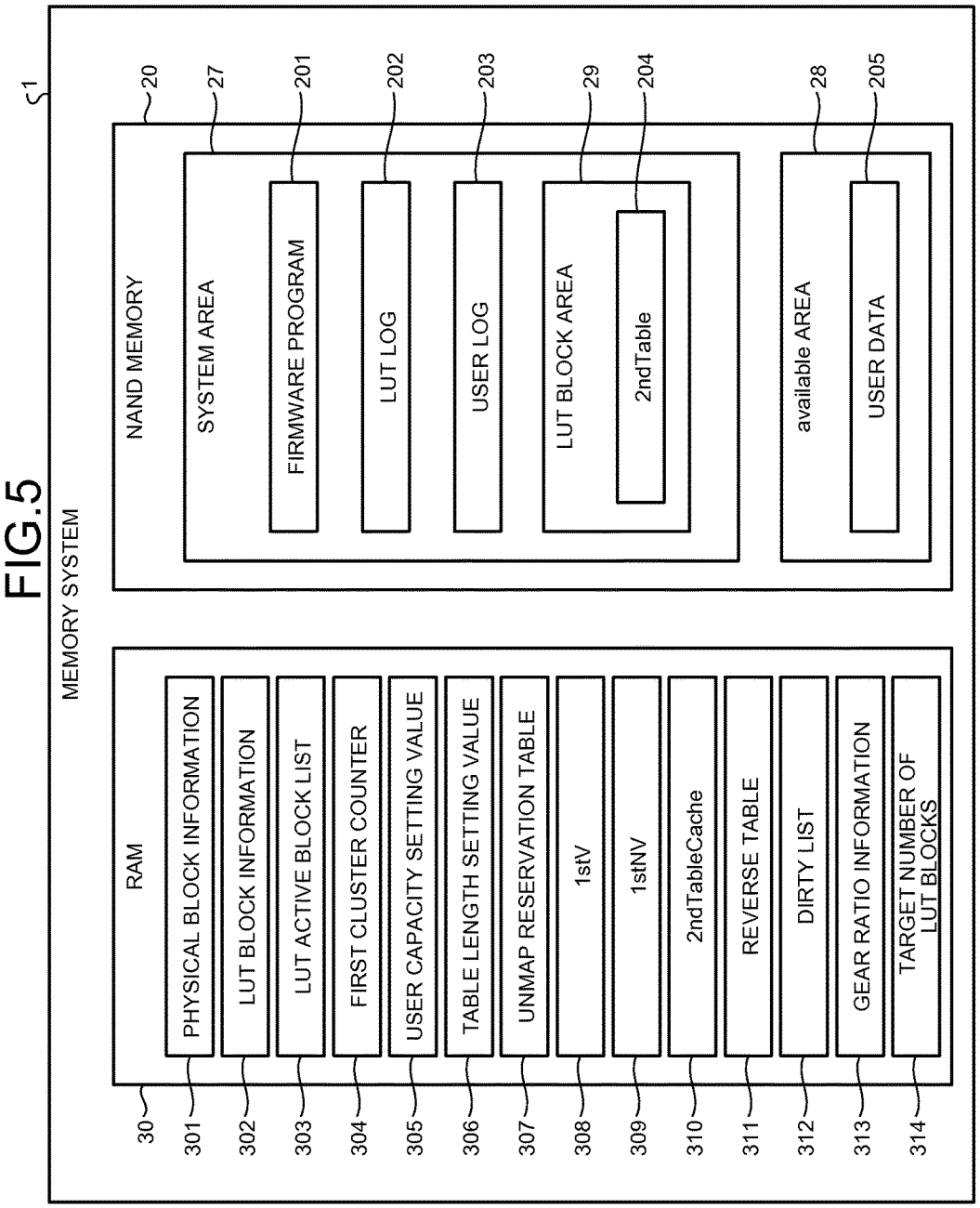
FIG. 5 is a diagram for describing each type of information stored in the memory system.

FIG. 5 is a diagram for describing various types of information which is stored in the memory system 1. The NAND memory 20 includes a system area 27 and an available area 28. The firmware program 201 is stored in the system area 27 in advance. In addition, an LUT log 202 is stored in the system area 27. In addition, an LUT block area 29 is allocated in the system area 27. A 2ndTable 204 is stored in the LUT block area 29.

The RAM 30 stores therein physical block information 301, LUT block information 302, an LUT active block list 303, a first cluster counter 304, a user capacity setting value 305, a table length setting value 306, a UNMAP reservation table 307, a 1stV 308, a 1stNV 309, a 2ndTableCache 310, a reverse table (reverse LUT) 311, a dirty list 312, gear ratio information 313, and a target number of LUT blocks 314.

The system area 27 is a storage area for storing system data. The system data is data required for the operation of the memory system 1, and data except data (user data 205) which is required to be written by the host 2. The available area 28 is a storage area for storing the user data 205. A size of the user capacity is smaller than that of the available area 28. The processing unit stores the valid user data 205 in the available area 28 at a maximum up to the size of the user capacity.

A state of the user data 205 stored in the available area 28 is a valid state or an invalid state. In a case where second user data 205 is sent in a state where first user data 205 is stored in the NAND memory 20 with designation of first address same as the first user data 205, the memory controller 10 writes the second user data 205 in the logical block having an empty page and regards the first user data 205 as the invalid user data 205. The "empty" state herein means a state where neither invalid data nor valid data is stored. The empty page is an empty area in which the data can be written. Since the writing to the NAND memory 20 is performed in such a scheme, the invalid user data 205 and the valid user data 205 are stored in each logical block. In other words, the "VALID" data means that the data is in a latest state. The latest state means a state of data written by the host 2 most recently among a plurality of data designated at the same first address stored in the NAND memory 20. The invalid data means data other than the data which is written by the host 2 most recently among the plurality of data designated at the same first address stored in the NAND memory 20.

Further, since the writing to the NAND memory 20 like the above-mentioned is performed, the number of empty logical blocks is decreased as the writing is kept on. The memory controller 10 performs a garbage collection in order to generate empty logical blocks. The garbage collection means a process in which the valid data is moved (copied) from one logical block to the empty area of another logical block, and then all the data stored in the logical block at the move source is regarded as the invalid data. The logical block at the move source is regarded as a free block after the garbage collection. Further, a group of free blocks is denoted as a free block pool. When each free block is subjected to the erase, the free block becomes empty. Further, regarding the garbage collection, the logical block at the move source is simply denoted as a source block. The logical block at a move destination is simply denoted as a destination block. The garbage collection carried out to the logical blocks included in the available area 28 is denoted as a user garbage collection. The garbage collection carried out to the logical blocks included in the LUT block area 29 is denoted as an LUT garbage collection.

A size obtained by subtracting the user capacity from the size of the available area 28 is denoted as an over-provisioning capacity.

Figure 6:
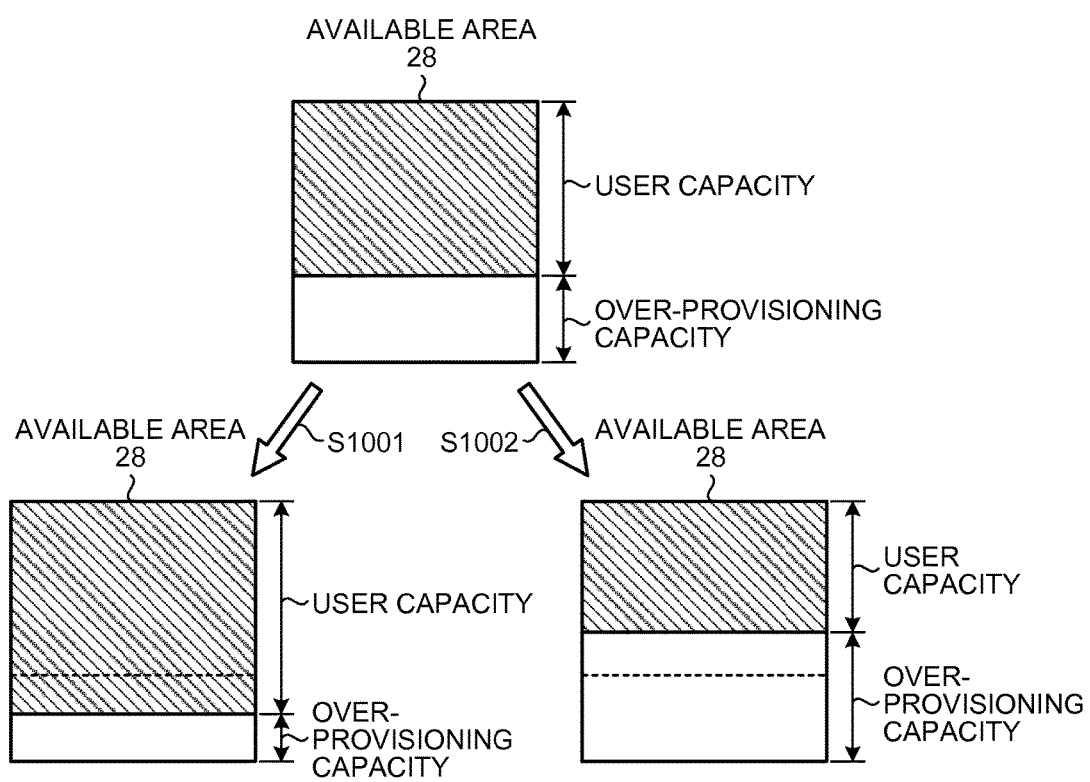
FIG. 6 is a diagram for describing control on a user capacity.

In this embodiment, the memory system 1 can receive a request for changing the user capacity (a user capacity decrease request, a user capacity increase request) from the host 2. When the memory system 1 receives the user capacity increase request, the processing unit increases the user capacity as illustrated in S1001 of FIG. 6. The over-provisioning capacity is decreased as the user capacity is increased. In addition, when the memory system 1 receives the user capacity decrease request, the processing unit decreases the user capacity as illustrated in S1002. The over-provisioning capacity is increased as the user capacity is decreased. The user capacity decrease request and the user capacity increase request, for example, are configured to include a size indicating a change amount of the user capacity.

Since the writing is performed on the NAND memory 20 by the above-mentioned scheme, the physical location indicated by the first address designated from the host 2 is changed at every writing. Then, the memory system 1 stores and updates a correspondence relation between the first address and the physical location designated from the host 2.

Figure 7:
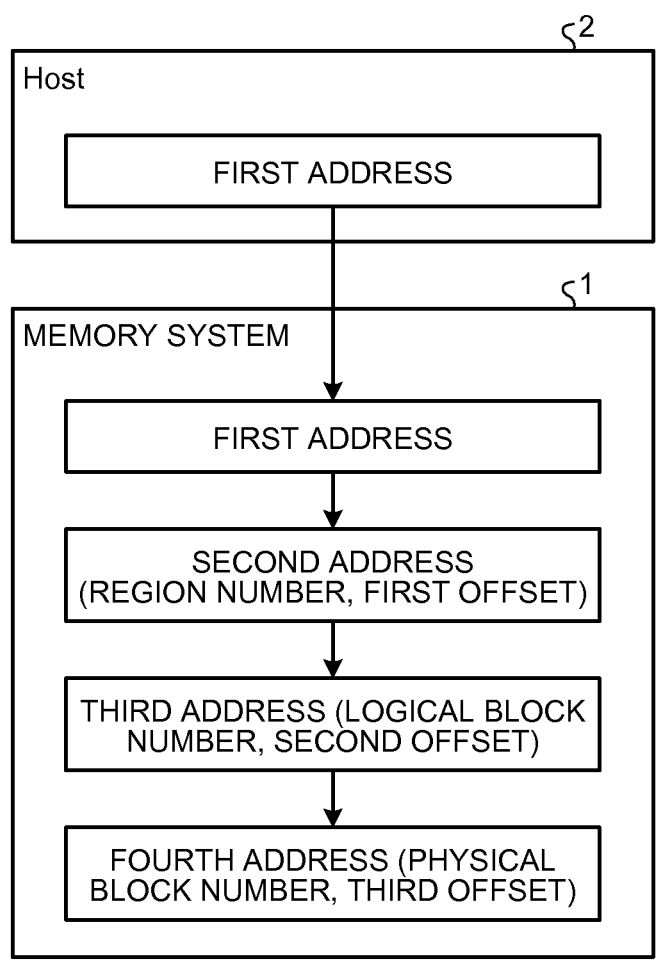
FIG. 7 is a diagram for describing a type of an address.

FIG. 7 is a diagram for describing a type of an address used in the memory system 1. The host 2 uses the first address to designate a location of data. The first address, for example, can designate data for each sector. The first address designated from the host 2 is converted to a second address by the processing unit. The second address is logical address information indicating a location of the data in units of a cluster. The cluster is composed of a plurality of sectors of which the first addresses indicating the locations of the respective sectors are consecutive. The correspondence relation between the first address and the second address, for example, is fixed. In other words, the second address belongs to the concept of a logical address similarly to the first address. The conversion from the first address to the second address, for example, is performed by a predetermined algorithm. For example, the algorithm shifts the first address in the right direction by an amount corresponding to the size of the cluster. Hereinafter, the data in units of a cluster is simply denoted as a cluster.

The second address includes a region number and a first offset. The region is composed of a plurality of clusters of which the second addresses indicating the locations of the respective clusters are consecutive with respect to logical address. In other words, the region means a range on a space of the second address (and the first address) of a size corresponding to the size of the plurality of clusters. The region number is a number for specifying each region. For example, the upper bits of the second address correspond to the region number, and the lower bits of the second address correspond to the first offset. The first offset indicates a location in units of a cluster in the region indicated by the region number.

The second address is translated into a third address by the processing unit. The third address includes the logical block number and a second offset. The second offset indicates a location in units of a cluster in the logical block indicated by the logical block number. In addition, the second offset includes the channel number, the bank number, and the plane number.

The third address is converted into a fourth address by the processing unit. The fourth address includes a physical block number and a third offset. The third offset indicates the physical location in units of a cluster in the physical block 25 indicated by the physical block number. The third offset includes the page number. The correspondence relation between the third address and the fourth address, for example, is fixed. In other words, the third address belongs to the concept of the physical address similarly to the fourth address.

The memory system 1 changes the correspondence relation between the second address and the third address in response to writing the data. The correspondence relation between the second address and the third address is recorded in a hierarchy. Herein, the correspondence relation between the second address and the third address is assumed to be recorded in a table having a two-level hierarchy. The third address is recorded in a second level of the hierarchy. In a first level of the hierarchy, a correspondence relation between the second address and a pointer indicating a location at which a record of the third address corresponding to the second address is stored. In the first level of the hierarchy, the records are stored in units of a region. In the second level of the hierarchy, the records are stored in units of a cluster. In the respective records of the second level of the hierarchy, a plurality of third addresses are recorded. Each of the plurality of third addresses recorded in a respective record of the second level of the hierarchy corresponds to each of the plurality of clusters included in the corresponding region.

A 2ndTable 204 corresponds to the second level of the hierarchy. The 2ndTableCache 310 represents cached data of the 2ndTable 204 in the RAM 30. The 1stV 308 and the 1stNV 309 correspond to the first level of the hierarchy. The LUT log 202 is log information in which a difference caused upon changing the 1stNV 309 is recorded.

Figure 8:
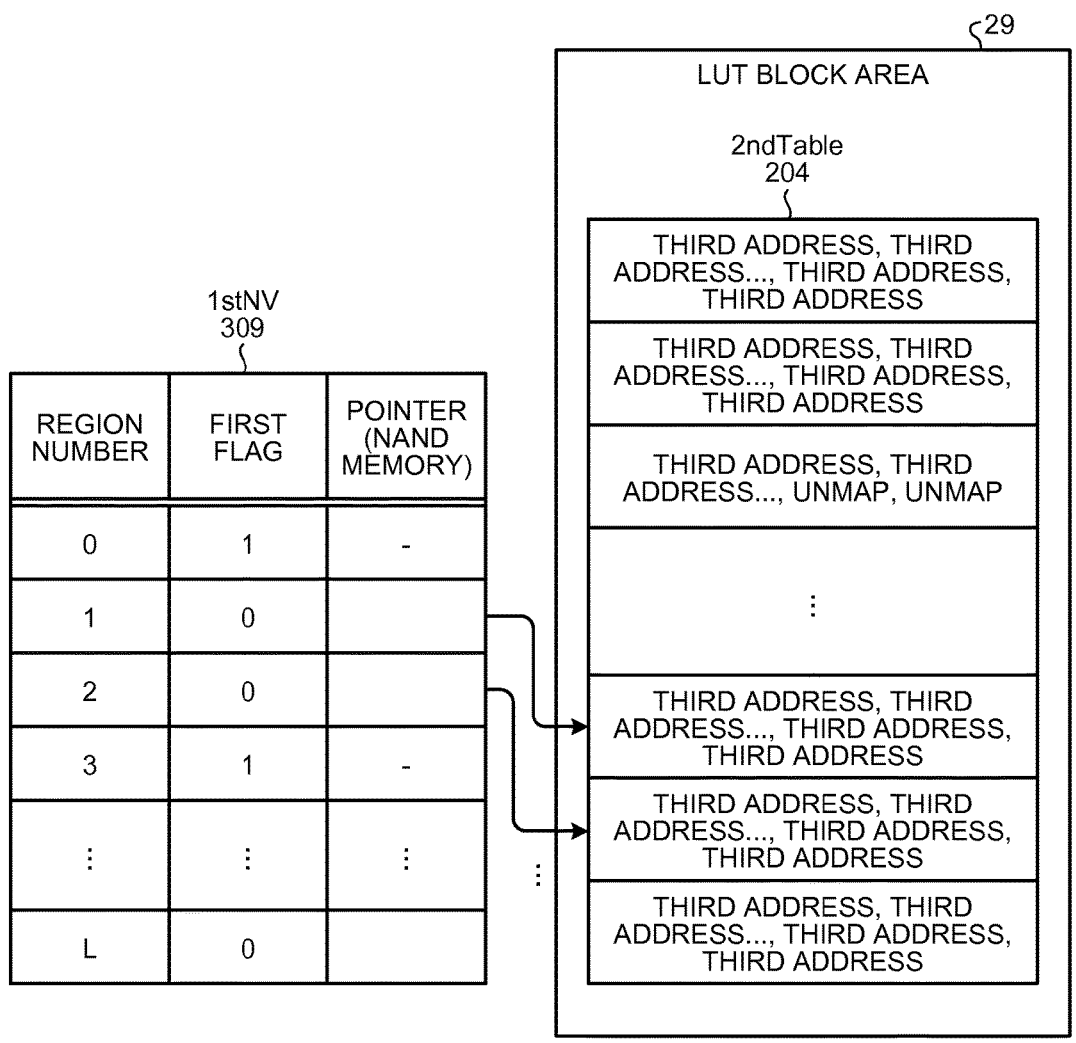
FIG. 8 is a diagram illustrating an exemplary data structure of a 1stNV and a 2ndTable.

FIG. 8 is a diagram illustrating an exemplary data structure of the 1stNV 309 and the 2ndTable 204. As illustrated in the drawing, each record recorded in the 1stNV 309 includes the region number as an index, and includes a pointer and a first flag as a data item. The pointer points to the physical location in the LUT block area 29. The pointer, for example, is described using the third address or the fourth address. At the location indicated by the pointer, a corresponding record of the 2ndTable 204 is stored. In each record of the 2ndTable 204, the third address or "UNMAP" is recorded for each of the plurality of clusters included in the region indicated by the index of the 1stNV 309. The "UNMAP" is a magic number indicating an UNMAP state (UNMAPPED state). The UNMAP state means a state where no physical address is associated with the logical address. In this embodiment, the UNMAP state is realized by the state where the second address is not associated with the third address. A state where some physical address is associated with the logical address is denoted as a non-UNMAP state (NOT-UNMAPPED state).

The first flag indicates whether there is a record belonging to the second level of the hierarchy. Herein, for example, a value "1" of the first flag indicates that there is no record belonging to the second level of the hierarchy, and a value "0" of the first flag indicates that there is a record belonging to second level of the hierarchy. The record having recorded with "1" as the first flag is not recorded with a pointer.

Figure 9:
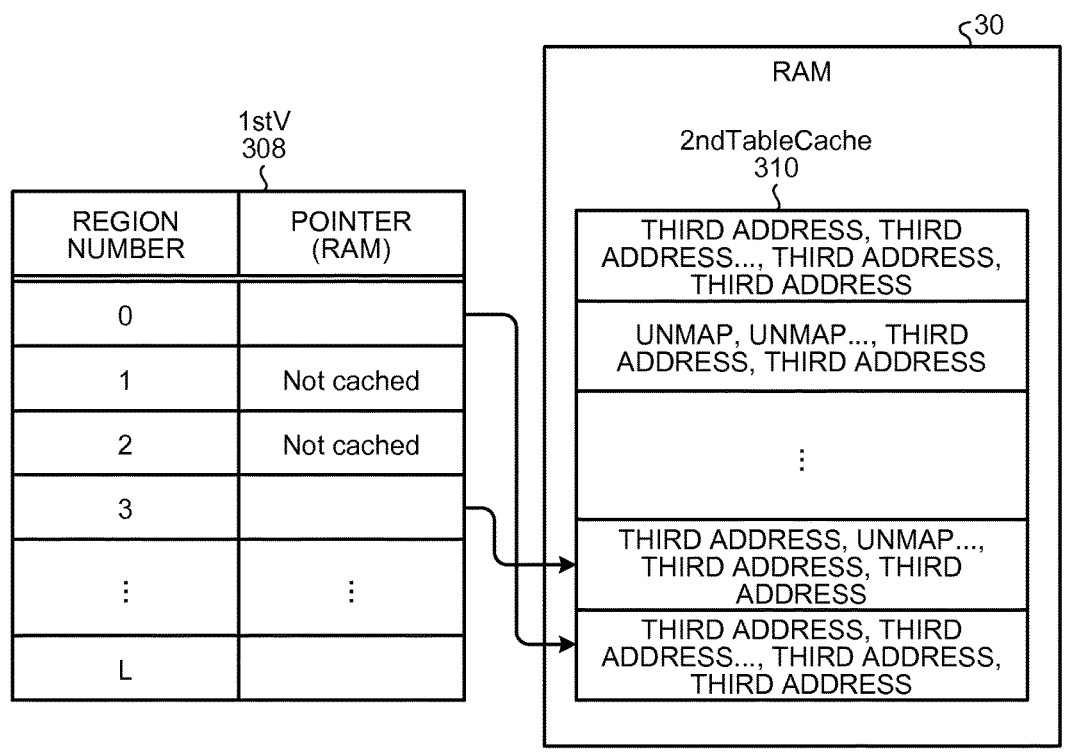
FIG. 9 is a diagram illustrating an exemplary data structure of a 1stV and a 2ndTableCache.

FIG. 9 is a diagram illustrating an exemplary data structure of the 1stV 308 and the 2ndTableCache 310. As illustrated in the drawing, each record recorded in the 1stV 308 includes the region number as an index, and includes a pointer as a data item. The pointer points to the physical location in the RAM 30. At the location indicating the pointer, a corresponding record of the 2ndTable 204 is stored as a record of the 2ndTableCache 310. In a case where no record is recorded in the 2ndTableCache 310, "Not cached" is recorded in the record of the 1stV 308. A state where a record is stored in the 2ndTableCache 310 will be simply denoted as a state where the region is cached.

In a steady state, table lengths of the 1stV 308 and the 1stNV 309 are equal to the number of regions included in the logical address space used in the memory system 1. The steady state means a state where the change in the user capacity performed by the process of S2020 or S2103 described below is completely reflected on the 1stV 308 and the 1stNV 309. Herein, the table length indicates the number of records. The table length is indicated by a unit of any type as long as the unit indicates the size of the table. The table lengths of the 1stV 308 and the 1stNV 309 correspond to the user capacity in the steady state. The table lengths of the 1stV 308 and the 1stNV 309 are stored in the RAM 30 as the table length setting value 306. The user capacity to be provided to the host 2 is stored in the RAM 30 as the user capacity setting value 305. In a case where an access request with a first address which is not included in a range defined by a predetermined starting address and a size indicated by the user capacity setting value 305 is received from the host 2, the memory controller 10 notifies an error to the host 2.

Figure 10:
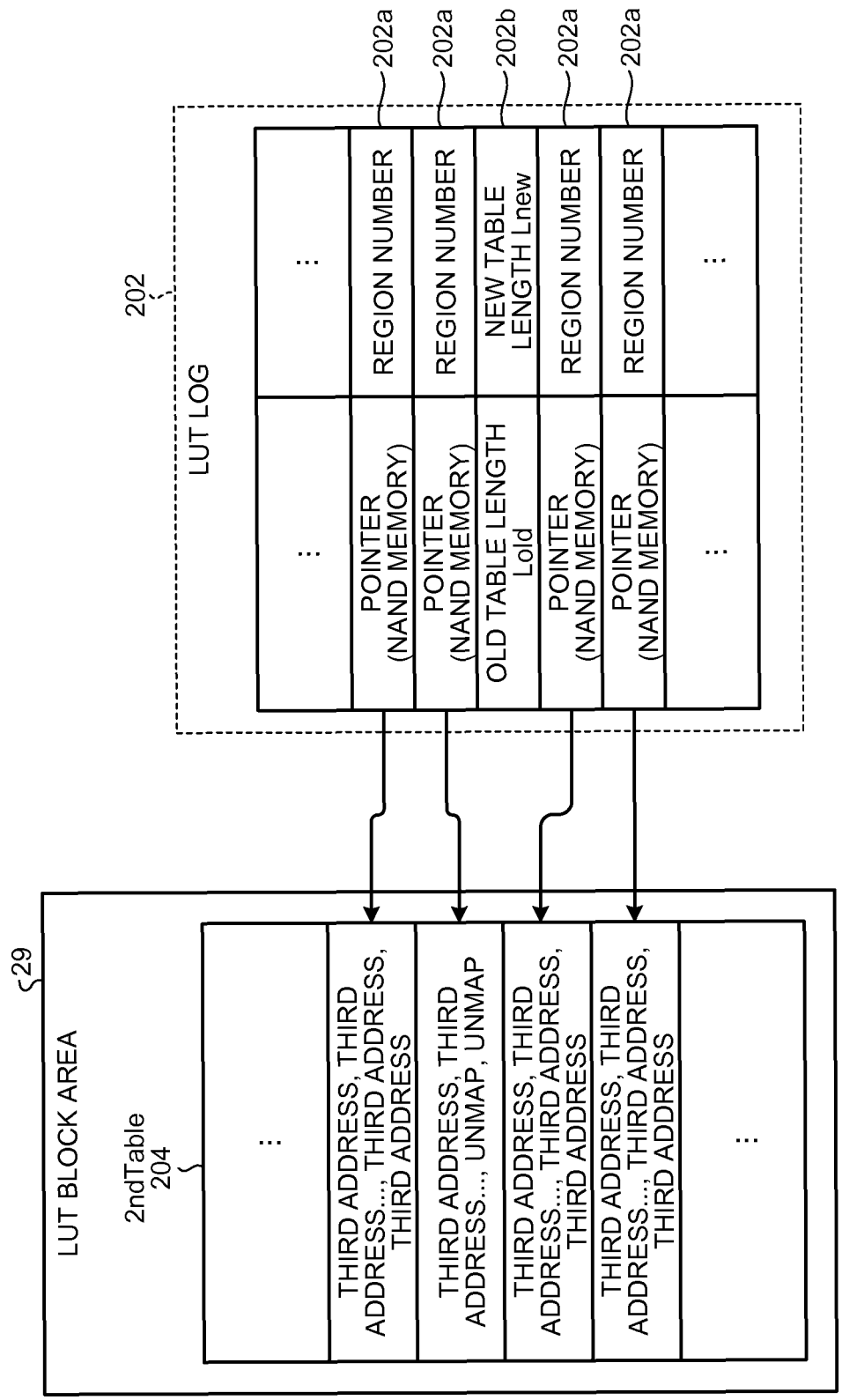
FIG. 10 is a diagram illustrating an exemplary data structure of an LUT log.

FIG. 10 is a diagram illustrating an exemplary data structure of the LUT log 202. As illustrated in the drawing, a content change log 202a and a size change log 202b are recorded in the LUT log 202. The content change log 202a is formed by a pair of a pointer and a region number. The size change log 202b is recorded therein a change in the table length of the 1stV 308 and the 1stNV 309. In the size change log 202b, a table length (an old table length) before changing and a table length (a new table length) after changing are recorded. Herein, the size change log 202b is recorded only in a case where the table length is changed to be increased. The respective records of the LUT log 202 are time-sequentially recorded. The LUT log 202 is used for recovery of the 1stNV 309 in the RAM 30.

In a case where an updating on the 2ndTableCache 310 is performed, there occurs a situation where the record cached in the 2ndTableCache 310 and the record recorded in the 2ndTable 204 are not matched in content. The state of the record of which the content is different between the 2ndTableCache 310 and the 2ndTable 204 from each other will be denoted as "dirty". The state of the record of which the content is matched between the 2ndTableCache 310 and the 2ndTable 204 will be denoted as "clean". The dirty list 312 is a list in which dirty records included in the 2ndTableCache 310 are recorded. In the dirty list 312, for example, a region numbers of the regions of which a state transits from a clean state to a dirty state are recorded in chronological order.

FIG. 11 is a diagram illustrating an exemplary data structure of the physical block information 301. The physical block information 301 is a table for specifying the physical block number upon converting the third address to the fourth address. In the example of FIG. 11, the physical block number is recorded for each combination of the logical block number, the channel number, the bank number, and the plane number. The physical block information 301, for example, is generated on manufacturing, and the generated physical block information 301 is recorded in the system area 27. The physical block information 301 is read from the system area 27 to the RAM 30 after start-up.

FIG. 12 is a diagram illustrating an exemplary data structure of the LUT block information 302. The LUT block information 302 is information to indicate a plurality of logical blocks included in the LUT block area 29. The logical blocks recorded in the LUT block information 302 are handled as the logical blocks included in the LUT block area 29, and the logical block which is not recorded in the LUT block information 302 is not handled as the logical block included in the LUT block area 29. As illustrated in the drawing, each record which is recorded in the LUT block information 302 includes an LUT block ID as an index, and includes a logical block number indicating the logical block included in the LUT block area 29 as a data item. The LUT block ID is an identity number assigned to each logical block included in the LUT block area 29.

The target number of LUT blocks 314 is information in which a setting value of the number of logical blocks included in the LUT block area 29 is recorded. The processing unit updates the target number of LUT blocks 314 in response to changing the table length setting value 306. Then, the processing unit controls the LUT block area 29 such that the number of logical blocks included in the LUT block area 29 is matched with the value recorded in the target number of LUT blocks 314 in the steady state.

Figures 13, 14:
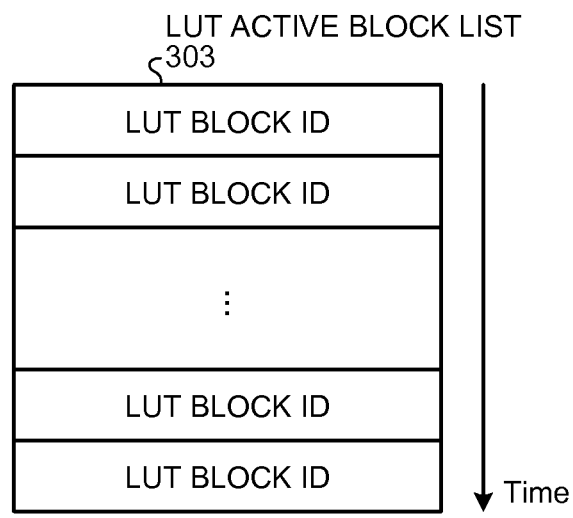
FIG. 13 is a diagram illustrating an exemplary data structure of an LUT active block list.
FIG. 14 is a diagram illustrating an exemplary data structure of a first cluster counter.

FIG. 13 is a diagram illustrating an exemplary data structure of the LUT active block list 303. The LUT active block list 303 is information in which series of the logical block numbers (or the LUT block IDs) which are indicating active blocks respectively in the LUT block area 29. In the LUT active block list 303, the logical block numbers (or the LUT block IDs) are recorded in an order of timing when recording of the 2ndTable 204 starts for each active block. Herein, after the records of the 2ndTable 204 have been recorded in one logical block and thereby the subject logical block becomes full, the records of the 2ndTable 204 begin to be recorded into the next available logical block. An active block means a logical block which is fully written in and having no empty page. Hereinafter, the active block recorded in the LUT active block list 303 will be denoted as an LUT active block.

FIG. 14 is a diagram illustrating an exemplary data structure of the first cluster counter 304. The first cluster counter 304 is information in which the number of valid clusters stored in the logical block is recorded in each logical block. Herein, it is assumed that the first cluster counter 304 has a record for each logical block included in the available area 28. As illustrated in the drawing, each record recorded in the first cluster counter 304 includes the logical block number as an index, and includes the number of valid clusters as a data item.

A user log 203 is information in which, for each cluster written in the available area 28, the second address converted from the first address designated at the time when the writing is requested by the write request or by the garbage collection is recorded. Each record included in the user log 203 is associated with the user data 205 in units of a cluster. For example, the system area 27 is allocated in a part of each logical block included in the available area 28. The record of the user log 203 is recorded in each system area 27 allocated in a part of each logical block included in the available area 28. Therefore, when the logical block is erased, the user data 205 and the records of the user log 203 corresponding to the user data 205 are erased at the same timing.

FIG. 15 is a diagram illustrating an exemplary data structure of the UNMAP reservation table 307. As illustrated in the drawing, each record of the UNMAP reservation table 307 includes the region number as an index, and includes a second flag as a data item. The second flag indicates whether the execution of an UNMAP process is reserved. The UNMAP process is a process of transitioning a state of a range designated on a space of the first address from the non-UNMAP state to the UNMAP state. Herein, the processing unit performs the UNMAP process by transitioning the state of the range designated on the space of the second address from a state where the third address is associated with to a state where the third address is not associated with. The UNMAP request is a request for causing the memory system 1 to perform the UNMAP process.

FIG. 16 is a diagram illustrating an exemplary data structure of the reverse table 311. As described above, the 1stNV 309 is a table for retrieving a pointer indicating a location at which the record corresponding to the region in the 2ndTable 204 is stored, by a region number. In contrast, the reverse table 311 is a table for retrieving the region number corresponding to the record by a pointer which indicates the location at which the record of the 2ndTable 204 is stored. According to the example of FIG. 16, each record of the reverse table 311 includes the LUT block ID as an index, and includes the plurality of region numbers as a data item. An order of the plurality of region numbers recorded in the data item of each record corresponds to an order of the locations at which the records of the 2ndTable 204 in the logical block are stored. Therefore, the processing unit, by referring to the reverse table 311 illustrated in FIG. 16, can acquire the region number corresponding to the record which is stored at a location indicated by a pointer of a retrieval target.

The gear ratio information 313 is information for obtaining a setting value of a ratio between volumes of data written by two kinds of data writing to the available area 28 (hereinafter, simply referred to as a "gear ratio"). The first data writing in the two kinds of data writing is data writing in response to a write request initiated by the host 2. The second data writing in the two kinds of data writing is writing data (that is, data to be copied from the source block to the destination block) to the available area 28 in the user garbage collection. Herein, the gear ratio is a ratio of the volume of the second data to the volume of the first data. In a case where a large volume of the data (copy volume) is copied from the source block to the destination block, the gear ratio is higher than that in a case where the copy volume is small. The processing unit controls the execution of the garbage collection such that the gear ratio becomes equal to a setting value obtained from the gear ratio information 313. The gear ratio information 313 defines a relation between the setting value of the gear ratio and either the number of free blocks or an over-provisioning percentage, or both of them. The over-provisioning percentage is a value obtained by dividing the over-provisioning capacity by the user capacity. The gear ratio information 313 may have a data structure of a lookup table. In addition, the gear ratio information 313 may be a function.

Figure 17:
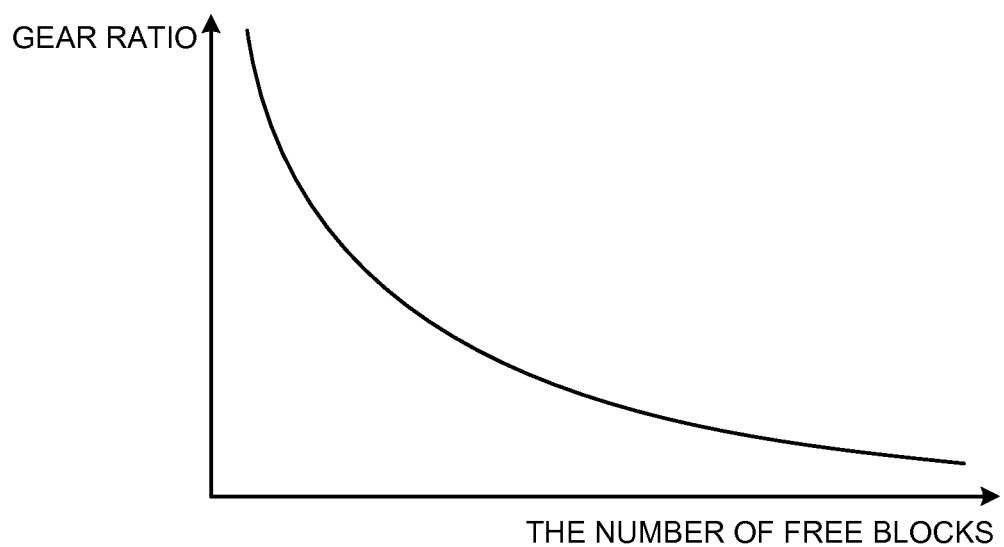
FIG. 17 is a diagram for describing gear ratio information.
Figure 18:
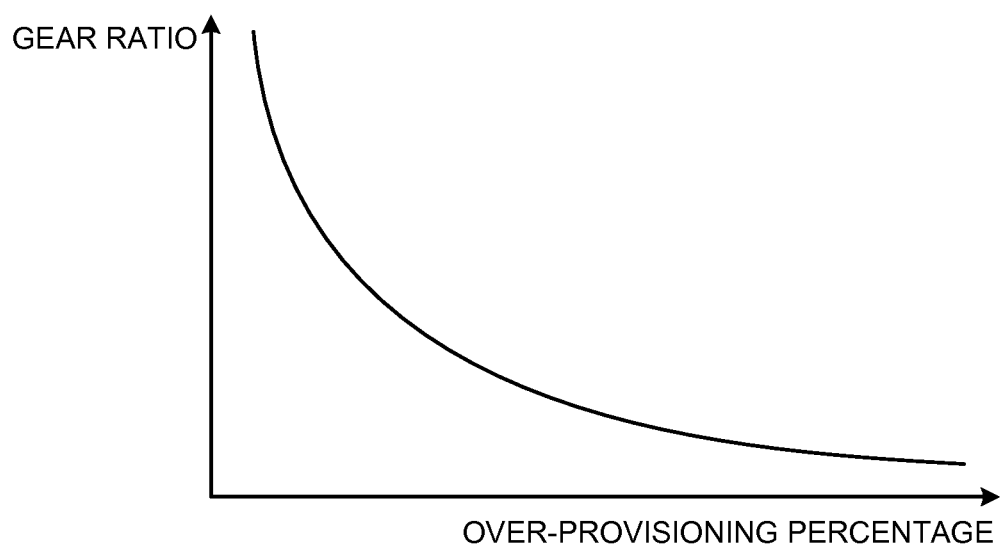
FIG. 18 is a diagram for describing the gear ratio information.

FIGS. 17 and 18 are diagrams for describing a relation which is defined by the gear ratio information 313.

As illustrated in FIG. 17, the gear ratio information 313 defines a relation between the number of free blocks and the gear ratio such that the gear ratio becomes lower as the number of free blocks is increased. The relation between the number of free blocks and the gear ratio may be defined in a stepped manner, or may be defined to be smoothly changed. The gear ratio information 313 defines the relation between the number of free blocks and the gear ratio such that the gear ratio in a case where the number of free blocks is a third value is higher than the gear ratio in a case where the number of free blocks is a fourth value larger than the third value.

As illustrated in FIG. 18, the gear ratio information 313 defines a relation between the over-provisioning percentage and the gear ratio such that the gear ratio becomes larger as the over-provisioning percentage is decreased. The relation between the over-provisioning percentage and the gear ratio may be defined to be changed in a stepped manner, or may be defined to be smoothly changed. The gear ratio information 313 defines the relation between the over-provisioning percentage and the gear ratio such that the gear ratio in a case where the over-provisioning percentage is a first value is larger than the gear ratio in a case where the over-provisioning percentage is a second value larger than the first value.

Further, the gear ratio information 313 may define a relation between the over-provisioning capacity and the gear ratio instead of the over-provisioning percentage. A tendency of a variation of the gear ratio with respect to a variation of the over-provisioning capacity is equal to a tendency of the gear ratio with respect to a variation of the over-provisioning percentage described above. In addition, the gear ratio information 313 may define a relation between the user capacity and the over-provisioning percentage using the available area 28 of which the size is fixed. For example, the gear ratio information 313 defines a relation between the user capacity and the gear ratio such that the gear ratio in a case where the user capacity is a fifth value is larger than the gear ratio in a case where the user capacity is a sixth value smaller than the fifth value.

Furthermore, the processing unit performs control on the gear ratio even for the LUT garbage collection. The gear ratio regarding the LUT garbage collection will be denoted as an LUT gear ratio for the distinction from the gear ratio regarding the user garbage collection. The LUT gear ratio is a ratio between volumes of data written by the two kinds of data writing to the LUT block area 29. The first data writing in the two kinds of data writing to the LUT block area 29 is writing data which is required for writing in the LUT block area 29 by the process (described below) of S1702. The second data writing in the two kinds of data writing to be written to the LUT block area 29 is writing data to the LUT block area 29 by the LUT garbage collection. The processing unit calculates a setting value of the LUT gear ratio according to the number of free blocks. Herein, the number of free blocks in the LUT garbage collection is a value obtained by subtracting the number of LUT active blocks from the target number of LUT blocks 314. A relation between the LUT gear ratio and the number of free blocks is set to be equal to that illustrated in FIG. 17. The processing unit controls the execution of the LUT garbage collection such that the LUT gear ratio is matched with the setting value of the LUT gear ratio.

Next, the operation of the memory system 1 of the first embodiment will be described.

The memory system 1 receives a warning of power off from the host 2 before the power is turned off. When the warning of the power off is received, the processing unit performs a power-off sequence. The power-off sequence includes a process of saving each of information in the RAM 30 into the system area 27. The dirty record described at least in the dirty list 312 is set as a target of the saving. For example, a dedicated area for the saving is allocated in the system area 27, and the dirty record is saved to the dedicated area together with other information of the target in the RAM 30. Alternatively, the dirty record may be recorded in the end of the 2ndTable 204 but not the dedicated area.

Further, any information other than the dirty record can be included in the target of the saving. The processing unit performs a power-on sequence immediately after the power is turned on. The power-on sequence includes a process of loading each of information into the RAM 30, and a process of recovering information lost from the RAM 30 by the power-off sequence. For example, during a period when the power-on sequence is performed, information which is unrecoverable in the RAM 30 is set as the target of the saving in the power-off sequence based on other information (the 2ndTable 204, the LUT log 202, and the like) stored in the NAND memory 20. In addition, the target of the saving in the power-off sequence may be selected according to which case can achieve shorter time required for the power-on sequence between a case where the recovering is performed and a case where the information is saved in the system area 27 in the power-off sequence and is loaded to the RAM 30 in the power-on sequence. Herein, as an example, the LUT block information 302, the LUT active block list 303, the first cluster counter 304, the user capacity setting value 305, the table length setting value 306, the UNMAP reservation table 307, the dirty record described in the dirty list 312, and the target number of LUT blocks 314 are assumed to be included in the target of the saving. Herein, the 1stNV 309 is recovered based on the LUT log 202. The reverse table 311 is recovered based on the 1stNV 309. In addition, the physical block information 301 and the gear ratio information 313 are stored in the system area 27 in advance (not illustrated), and loaded from the system area 27 to the RAM 30 in the power-on sequence. The physical block information 301 and the gear ratio information 313 are lost from the RAM 30 in the power-off sequence.

An event where the power supply is disconnected without any warning on the power off is denoted as power interruption. The memory system 1 includes a battery (not illustrated) for performing the power-off sequence even at the time of the power interruption. The memory system 1 performs the power-off sequence using the power of the battery immediately after the power interruption. Further, the power-off sequence based on the warning and the power-off sequence at the time of the power interruption may be different, or may be equal. Herein, as an example, the same information as in the case of the power-off sequence based on the warning are assumed to be used as the target of the saving even in the power-off sequence at the time of the power interruption.

Figure 19:
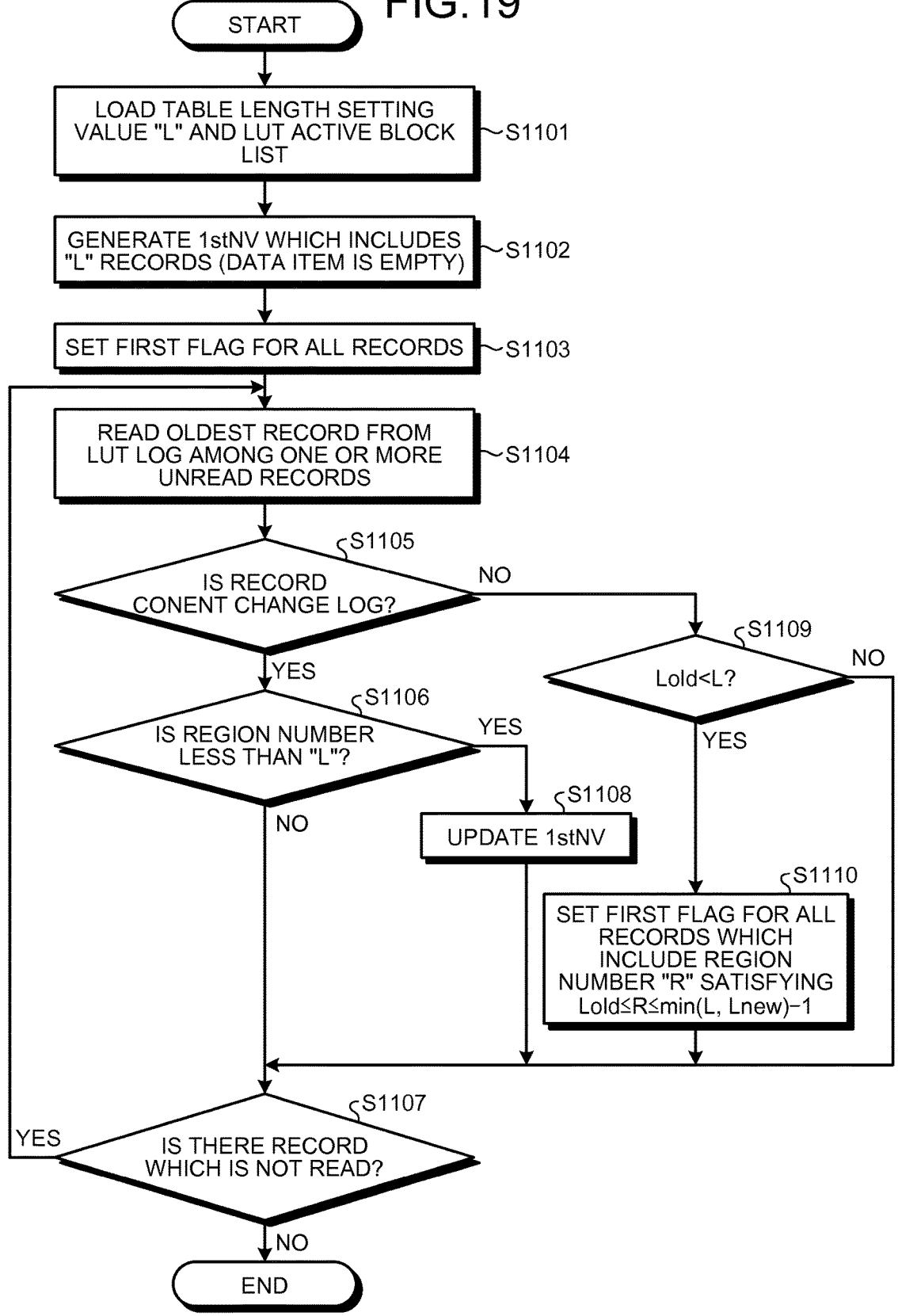
FIG. 19 is a flowchart for describing an operation of restoring 1stNV.

In this embodiment, the processing unit recovers the 1stNV 309 based on the LUT log 202. FIG. 19 is a flowchart for describing an operation of restoring the 1stNV 309.

First, the processing unit loads the table length setting value 306 and the LUT active block list 303 from the system area 27 to the RAM 30 (S1101). Further, the table length described in the table length setting value 306 is denoted as "L". Then, the processing unit generates the 1stNV 309 which includes "L" records having the empty data item in the RAM 30 (S1102). In the process of S1102, the records having the region numbers from "0" to "L−1" are generated.

Subsequently, the processing unit sets the first flag of each of the entire records (S1103). The setting of the first flag herein means recording "1" in the first flag. Then, the processing unit reads the oldest record from the LUT log 202 (S1104). Then, the processing unit determines whether the record is the content change log 202a (S1105). In a case where the record is the content change log 202a (Yes in S1105), the processing unit determines whether the region number included in the content change log 202a is less than "L" (S1106).

In a case where the region number included in the content change log 202a is not less than "L" (No in S1106), the processing unit determines whether there is an unread record (S1107). In a case where there is an unread record (Yes in S1107), the processing unit performs the process of S1104 on one or more unread records again. In a case where the region number included in the content change log 202a is less than "L" (Yes in S1106), the processing unit updates the 1stNV 309 based on the content change log 202a (S1108). Specifically, the processing unit selects a record of the 1stNV 309 which includes the region number included in the content change log 202a as an index. Then, the processing unit stores the pointer included in the content change log 202a in the data item of the selected record. The processing unit performs the process of S1107 after the process of S1108.

In a case where the record is not the content change log 202a (No in S1105), that is, in a case where the record is the size change log 202b, the processing unit determines whether "Lold" is less than "L" (S1109). Herein, "Lold" is a value of the old table length included in the size change log 202b. In a case where "Lold" is not less than "L" (No in S1109), the processing unit performs the process of S1107. In a case where "Lold" is less than "L" (Yes in S1109), the processing unit sets the first flags of all the records which include the region numbers in the range from "Lold" to a value obtained by subtracting "1" from the smallest one of "L" and the new table length "Lnew" (S1110). After the process of S1110, the processing unit performs the process of S1107.

In a case where there is no unread record (No in S1107), the recovery of the 1stNV 309 is completed. The processing unit ends the recovery operation of the 1stNV 309.

The processing unit can generate the reverse table 311 based on the recovered 1stNV 309.

Figure 20:
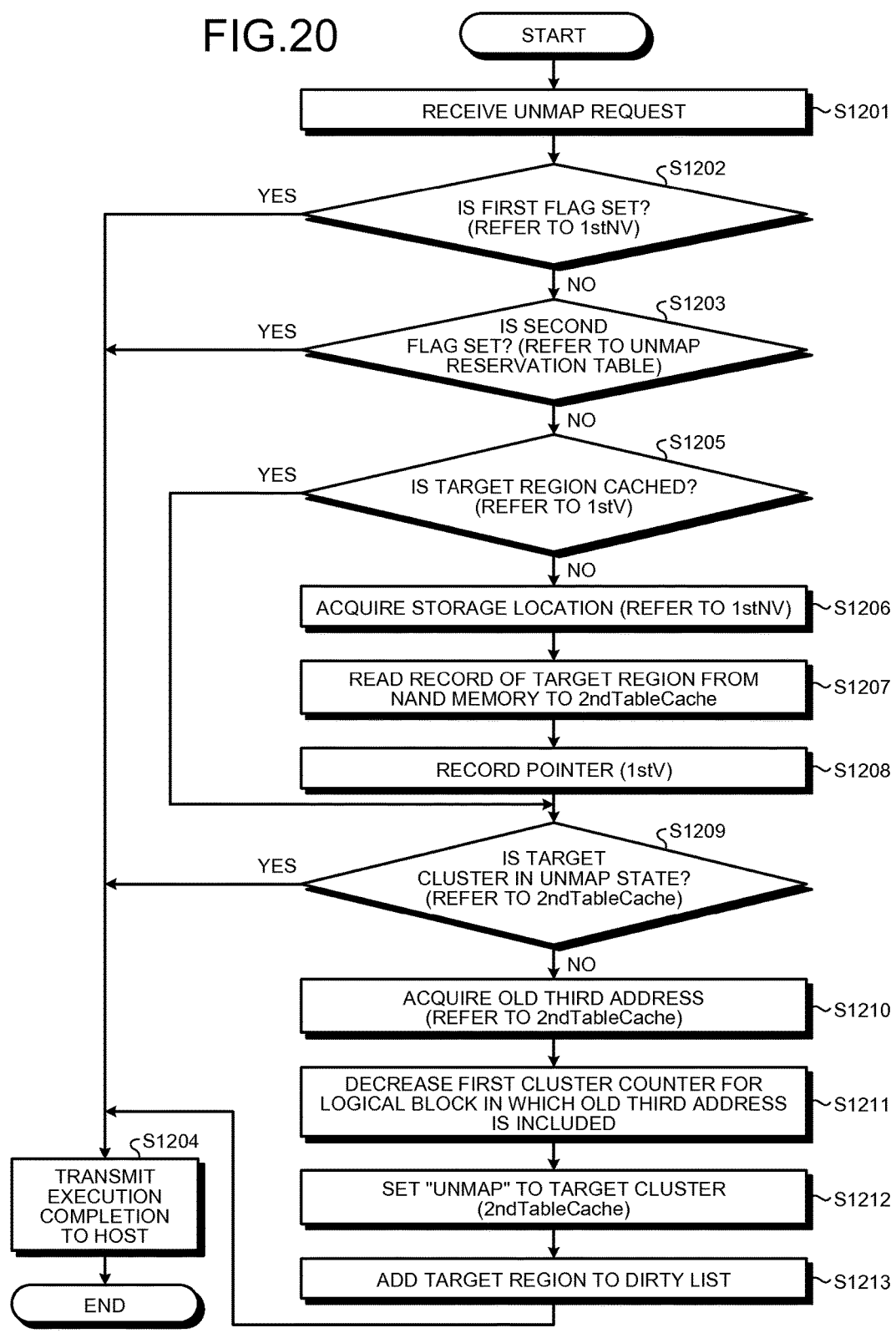
FIG. 20 is a flowchart for describing a first response process.
Figure 21:
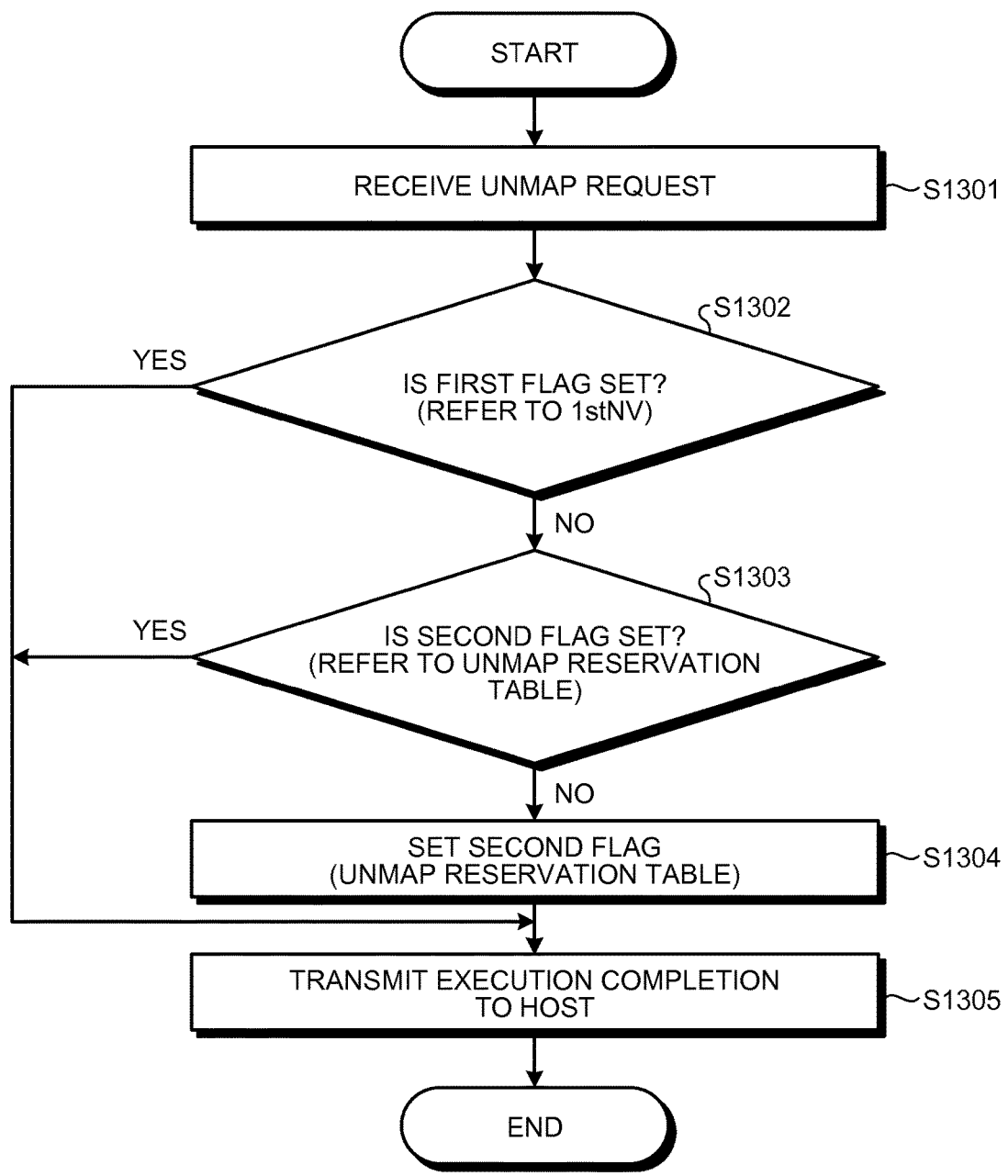
FIG. 21 is a flowchart for describing a second response process.

FIGS. 20 and 21 are flowcharts for describing a response process in response to the UNMAP request. The UNMAP request includes a designation of a target range of the UNMAP process. The target range of the UNMAP process, for example, is designated by combination of the first address indicating a head location of the range and a size of the range. The processing unit performs a first response process or a second response process according to the target range of the UNMAP process. In a case where the target range of the UNMAP process is smaller than the size of a region, the processing unit performs the first response process. In a case where the target range of the UNMAP process is one or more regions, the processing unit performs the second response process. FIG. 20 is a flowchart for describing the first response process, and FIG. 21 is a flowchart for describing the second response process.

First, the first response process will be described. In the description of FIG. 20, a cluster designated as the target of the UNMAP process is denoted as a target cluster, and a region included in the target cluster is denoted by a target region.

When the processing unit receives the UNMAP request from the host 2 (S1201), the processing unit determines whether the first flag is set for the target region by referring to the 1stNV 309 (S1202). In a case where the first flag is not set for the target region (No in S1202), the processing unit determines whether the second flag is set for the target region by referring to the UNMAP reservation table 307 (S1203). In a case where the first flag is set for the target region (Yes in S1202), or a case where the second flag is set for the target region (Yes in S1203), the processing unit transmits the completion of the UNMAP process to the host 2 (S1204), and ends the first response process.

In a case where the second flag is not set for the target region (No in S1203), the processing unit determines whether the target region is cached by referring to the 1stV 308 (S1205). In a case where the target region is not cached (No in S1205), the processing unit acquires a pointer indicating a location on the NAND memory 20 at which the record of the target region is stored by referring to the 1stNV 309 (S1206). Then, the processing unit reads the record of the target region from the location indicated by the acquired pointer to the 2ndTableCache 310 (S1207). In response to the updating of the 2ndTableCache 310 by the process of S1207, the processing unit records the 1stV 308 with a pointer indicating a location where the record of the target region is cached (S1208).

In a case where the target region is cached (Yes in S1205), or after the process of S1208, the processing unit determines whether the target cluster is in the UNMAP state by referring to the 2ndTableCache 310 (S1209). In a case where the target cluster is not in the UNMAP state (No in S1209), the processing unit acquires the third address set in the target cluster by referring to the 2ndTableCache 310 (S1210). In the first response process, the third address acquired by the process of S1210 is denoted as an old third address. The processing unit decreases a value recorded in the first cluster counter 304 for the logical block including the old third address (S1211). The processing unit sets "UNMAP" to the target cluster in the 2ndTableCache 310 (S1212). The processing unit adds the target region to the dirty list 312 (S1213). Then, the processing unit performs the process of S1204. In a case where the target cluster is in the UNMAP state (Yes in S1209), the processing unit skips the processes of S1210 to S1213.

Further, in a case where the range designated as the target of the UNMAP process includes the plurality of clusters, the processing unit performs a series of processes illustrated in FIG. 20 on all the clusters in the range designated as the target of the UNMAP process. Alternatively, the processing unit makes the process of S1204 for all the clusters in the range designated as the target of the UNMAP process ready, and then transmits the completion of the UNMAP process to the host 2 just one time.

Next, the second response process will be described. In FIG. 21, the region designated as the target of the UNMAP process by the UNMAP request is denoted as a target region.

When the UNMAP request is received from the host 2 (S1301), the processing unit determines whether the first flag is set for the target region by referring to the 1stNV 309 (S1302). In a case where the first flag is not set for the target region (No in S1302), the processing unit determines whether the second flag is set for the target region by referring to the UNMAP reservation table 307 (S1303). In a case where the second flag is not set for the target region (No in S1303), the processing unit sets the second flag for the target region (S1304). In a case where the first flag is set for the target region (Yes in S1302), or a case where the second flag is set for the target region (Yes in S1303), or after the process of S1304, the processing unit transmits the completion of the UNMAP process to the host 2 (S1305), and ends the second response process.

In this way, in a case where the UNMAP process in units of a region is required, and a case where the first flag is not set, the processing unit sets the second flag and then transmits the completion of the UNMAP process. According to an operation to be described below, the processing unit can perform an actual cluster-wise UNMAP process in background for the region with the second flag set after the completion of the UNMAP process is transmitted.

Further, in a case where the region designated as the target of the UNMAP process includes a plurality of the region, the processing unit performs a series of processes illustrated in FIG. 21 on all the regions designated as the target of the UNMAP process. Alternatively, the processing unit makes the process of S1305 for all the regions in the range designated as the target of the UNMAP process ready, and then transmits the completion of the UNMAP process the host 2 only one time.

Figure 22:
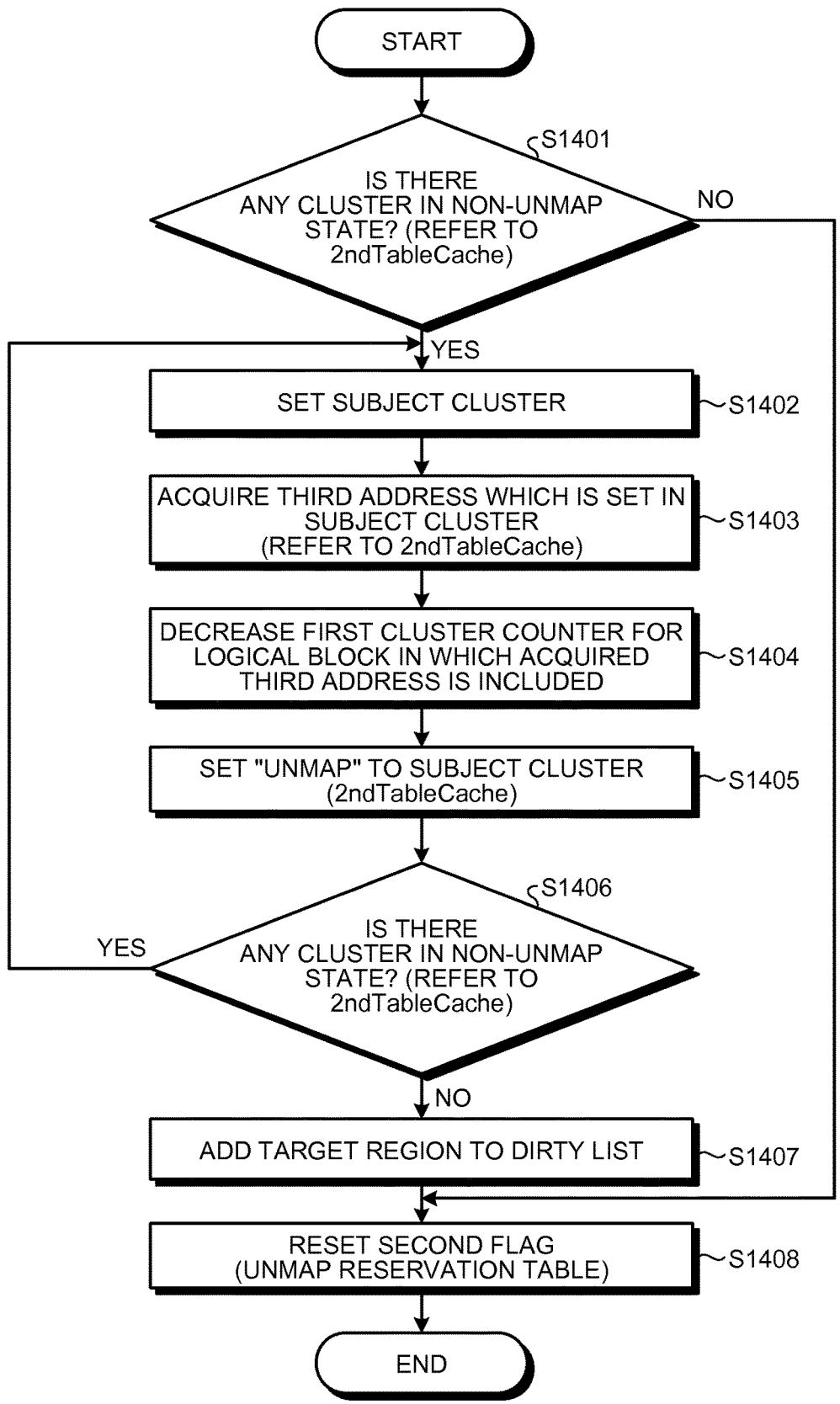
FIG. 22 is a flowchart for describing a region UNMAP process.

FIG. 22 is a flowchart for describing the UNMAP process (hereinafter, simply referred to as a "region UNMAP process") in units a region. The processing unit can perform the operation illustrated in FIG. 22 at any timing after the second response process. In addition, the region UNMAP process is appropriately called in the middle of performing an address resolution process, an address update process, a user garbage collection, and a capacity decrease process which will be described below. In addition, while there is a region for which the second flag is set, the processing unit can perform the region UNMAP process in the background on the region for which the second flag is set. The processing unit performs the region UNMAP process on the region which is in a state where the second flag is set in the UNMAP reservation table 307. In the description of FIG. 22, the region which is in the state where the second flag is set in the UNMAP reservation table 307 and is the target of the region UNMAP process is denoted as a target region. In addition, the description of FIG. 22 will be made on the assumption that the target region is cached in advance. In other words, in a case where the target region is not cached, the processing unit reads the record of the target region from the NAND memory 20 to the 2ndTableCache 310 and then performs the region UNMAP process.

First, the processing unit determines whether there is one or more clusters of the non-UNMAP state in the target region by referring to the 2ndTableCache 310 (S1401). In a case where there is one or more clusters of the non-UNMAP state in the target region (Yes in S1401), the processing unit sets one of one or more clusters of the non-UNMAP state present in the target region as a subject cluster (S1402). The processing unit acquires the third address which is set in the subject cluster by referring to the 2ndTableCache 310 (S1403). The processing unit decreases a value recorded in the first cluster counter 304 for the logical block in which the acquired third address is included (S1404). The processing unit sets "UNMAP" to the subject cluster in the 2ndTable-Cache 310 (S1405), and determines whether there is one or more clusters of the non-UNMAP state in the target region again (S1406). In a case where there is one or more clusters of the non-UNMAP state in the target region (Yes in S1406), the processing unit performs the process of S1402. In a case where all the clusters present in the target region are in the UNMAP state (No in S1406), the processing unit adds the target region in the dirty list 312 (S1407), and resets the second flag for the target region (S1408).

In a case where all the clusters present in the target region are in the UNMAP state (No in S1401), the processing unit skips the processes of S1402 to S1407.

Further, there is a following capacity decrease process as one of the sources calling the region UNMAP process. In the region UNMAP process called by the capacity decrease process, the process of S1407 may be performed or may be skipped.

Figure 23:
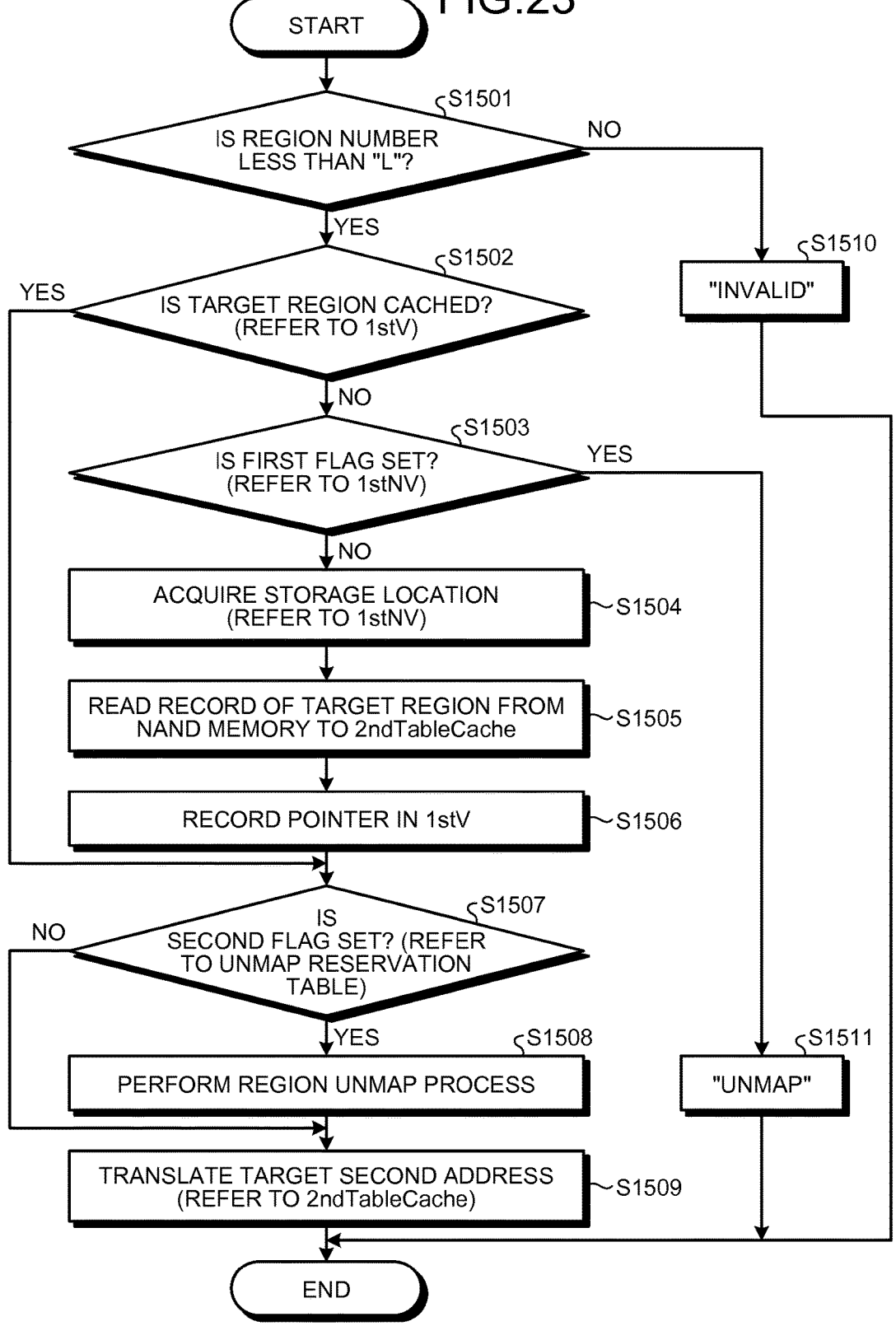
FIG. 23 is a flowchart for describing an address resolution process.

FIG. 23 is a flowchart for describing a process of translating the second address into the third address (hereinafter, referred to as an "address resolution process"). The second address which is a target of the address resolution process is denoted as a target second address. The region indicated by the region number included in the target second address is denoted as a target region.

First, the processing unit determines whether the region number of the target region is less than "L" (S1501). In a case where the region number of the target region is less than "L" (Yes in S1501), the processing unit determines whether the target region is cached by referring to the 1stV 308 (S1502). In a case where the target region is not cached (No in S1502), the processing unit determines whether the first flag is set for the target region by referring to the 1stNV 309 (S1503).

In a case where the first flag is not set for the target region (No in S1503), the processing unit acquires a pointer indicating a location on the NAND memory 20 at which the record of the target region is stored by referring to the 1stNV 309 (S1504). Then, the processing unit reads the record of the target region from the location indicated by the acquired pointer to the 2ndTableCache 310 (S1505). In response to the updating of the 2ndTableCache 310 by the process of S1205, the processing unit records the 1stV 308 with the pointer indicating the location where the record of the target region is cached (S1506).

In a case where the target region is cached (Yes in S1502), or after the process of S1506, the processing unit determines whether the second flag is set for the target region by referring to the UNMAP reservation table 307 (S1507). In a case where the second flag is set for the target region (Yes in S1507), the processing unit performs the region UNMAP process on the target region (S1508).

In a case where the second flag is not set for the target region (No in S1507), or after the process of S1508, the processing unit translates the target second address into the third address by referring to the 2ndTableCache 310 (S1509), and ends the operation. Further, the processing unit may acquire "UNMAP" instead of the third address as a translation result.

In a case where the region number of the target region is not less than "L" (No in S1501), the processing unit acquires "INVALID" as the translation result (S1510), and ends the operation. In addition, in a case where the first flag is set for the target region (Yes in S1503), the processing unit acquires "UNMAP" as the translation result (S1511), and ends the address resolution process.

Further, in the following description, the processing unit performs the region UNMAP process (S1508) based on the determination result about whether the second flag is set for the target region (S1507). The processing unit may be configured to acquire "UNMAP" as the translation result without performing the region UNMAP process in a case where the second flag is set for the target region (S1508).

Figure 24:
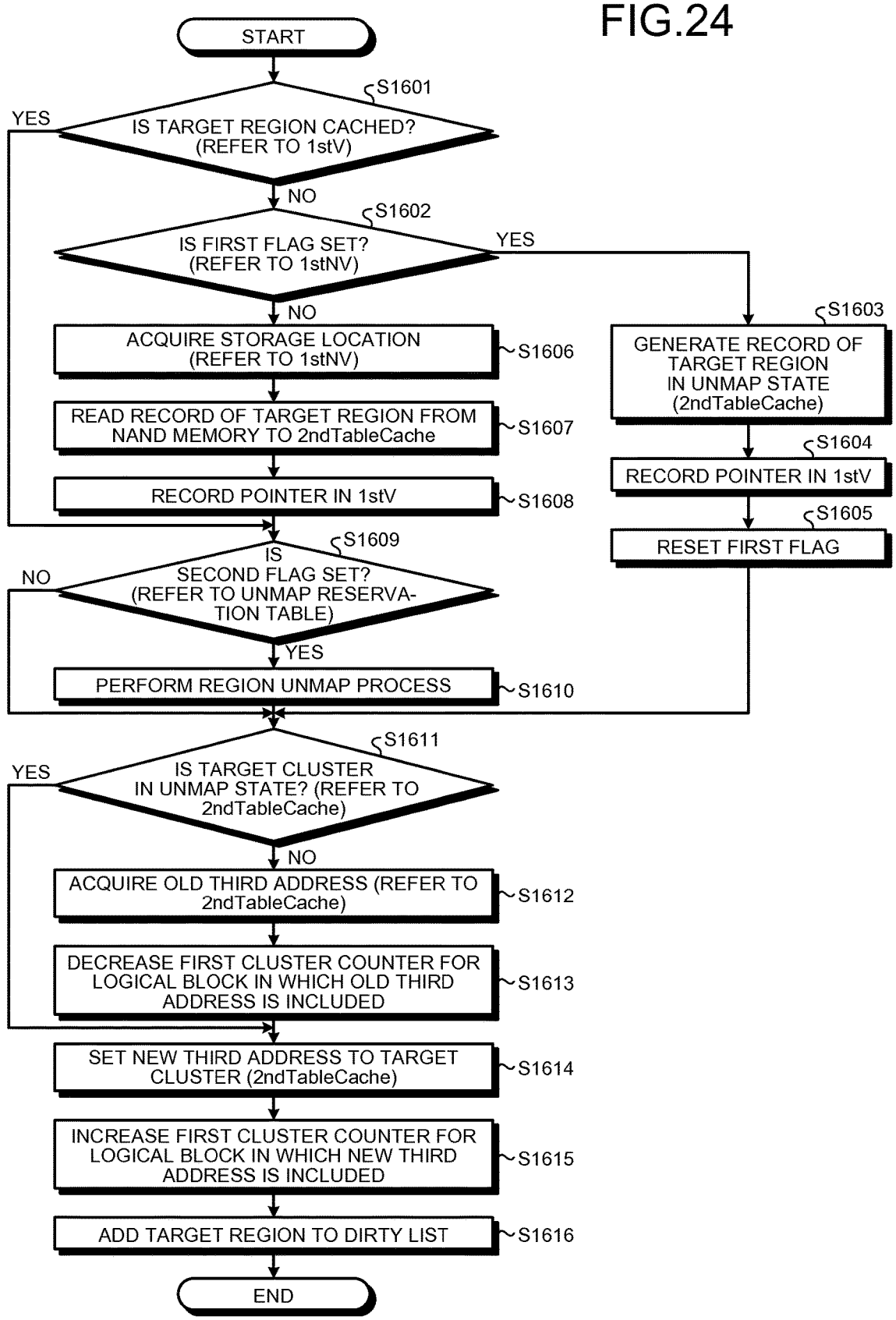
FIG. 24 is a flowchart for describing an address update process.

FIG. 24 is a flowchart for describing recording a new third address (hereinafter, referred to as an "address update process"). The cluster indicated by the target second address of the address update process is denoted as a target cluster. The region which includes the target cluster is denoted as a target region.

First, the processing unit determines whether the target region is cached by referring to the 1stV 308 (S1601). In a case where the target region is not cached (No in S1601), the processing unit determines whether the first flag is set for the target region by referring to the 1stNV 309 (S1602).

In a case where the first flag is set for the target region (Yes in S1602), the processing unit generates a record of the target region in the 2ndTableCache 310 (S1603). Further, in the process of S1603, the processing unit sets "UNMAP" to all the clusters for the record of the target region. The processing unit records the 1stV 308 with the pointer indicating the location at which the record of the target region is cached (S1604). Then, the processing unit decreases the first flag for the target region (S1605).

In a case where the first flag is not set for the target region (No in S1602), the processing unit acquires the pointer indicating the location on the NAND memory 20 at which the record of the target region is stored by referring to the 1stNV 309 (S1606). Then, the processing unit reads the record of the target region from the location indicated by the acquired pointer to the 2ndTableCache 310 (S1607). The processing unit records the 1stV 308 with the pointer indicating the location at which the record of the target region is cached (S1608).

In a case where the target region is cached (Yes in S1601), or after the process of S1608, the processing unit determines whether the second flag is set for the target region by referring to the UNMAP reservation table 307 (S1609). In a case where the second flag is set for the target region (Yes in S1609), the processing unit performs the region UNMAP process on the target region (S1610).

After the process of S1605, in a case where the second flag is not set for the target region (No in S1609), or after the process of S1610, the processing unit determines whether the target cluster is in the UNMAP state by referring to the 2ndTableCache 310 (S1611). In a case where the target cluster is not in the UNMAP state (No in S1611), the processing unit acquires the third address of the target cluster by referring to the 2ndTableCache 310 (S1612). In the description of FIG. 24, the third address acquired by the process of S1612 is denoted as an old third address. The processing unit decreases a value recorded in the first cluster counter 304 for the logical block in which the old third address is included (S1613). In a case where the target cluster is in the UNMAP state (Yes in S1611), the processing unit skips the processes of S1612 and S1613.

Subsequently, the processing unit sets a new third address to the target cluster in the 2ndTableCache 310 (S1614). The processing unit increases a value recorded in the first cluster counter 304 for the logical block in which the new third address is included (S1615). Then, the processing unit adds the target region to the dirty list 312 (S1616), and ends the address update process.

Figure 25:
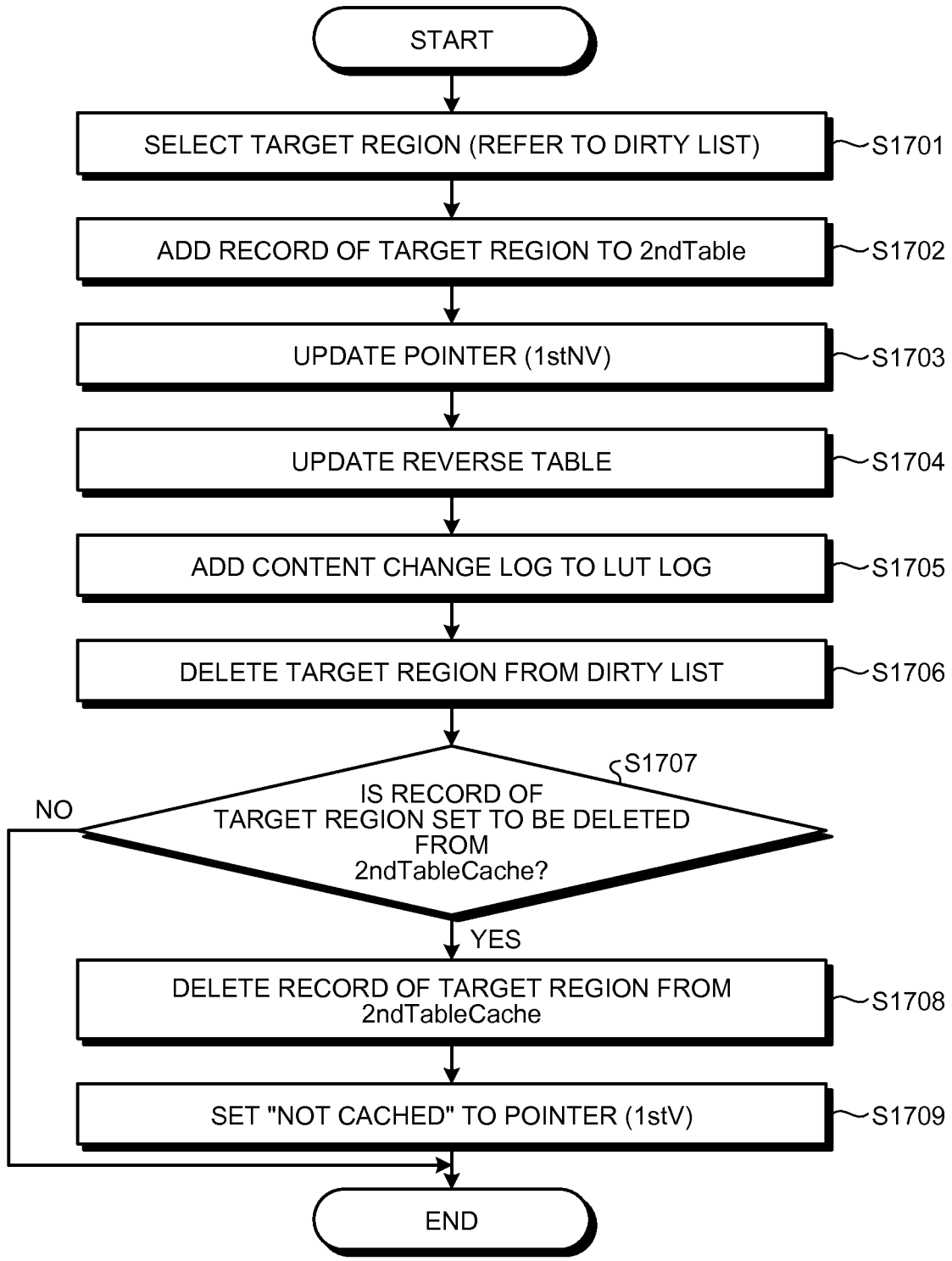
FIG. 25 is a flowchart for describing an operation of non-volatilization of a record.

FIG. 25 is a flowchart for describing an operation of non-volatilization of the record described in the dirty list 312. First, the processing unit selects a target region of the non-volatilization by referring to the dirty list 312 (S1701). In the process of S1701, the processing unit selects the region added to the dirty list 312 earliest among one or more regions described in the dirty list 312 as the target region of the non-volatilization. In the description of FIG. 25, the target region of the non-volatilization is denoted as a target region.

Subsequently, the processing unit records (adds) the record of the target region recorded in the 2ndTableCache 310 in the end of the 2ndTable 204 (S1702). The processing unit updates a pointer recorded in the 1stNV 309 (S1703), updates the reverse table 311 (S1704), and adds the content change log 202a to the LUT log 202 in response to adding the record to the 2ndTableCache 310 (S1705). Specifically, in the process of S1703, the processing unit overwrites the pointer recorded in the 1stNV 309 for the target region with the pointer indicating the location at which the record of the target region is recorded by the process of S1702. In the process of S1704, the processing unit obtains the LUT block ID of the logical block in which the record of the target region is recorded by the process of S1702. Then, the processing unit adds the region number of the target region to the record having the obtained LUT block ID as an index. In addition, in the process of S1705, the processing unit records (adds) the content change log 202a formed by pairing the pointer pointing the location at which the record of the target region is recorded by the process of S1702 with the region number of the target region to the end of the LUT log 202.

Then, the processing unit deletes the target region from the dirty list 312 (S1706). In a case where the record of the target region is set to be deleted from the 2ndTableCache 310 (Yes in S1707), the record of the target region is deleted from the 2ndTableCache 310 (S1708), and "Not cached" is set to the pointer of the 1stV 308 (S1709). Then, the processing unit ends the operation. In a case where the record of the target region is set not to be deleted from the 2ndTableCache 310 (No in S1707), the processing unit skips the processes of S1708 and S1709.

Figure 26:
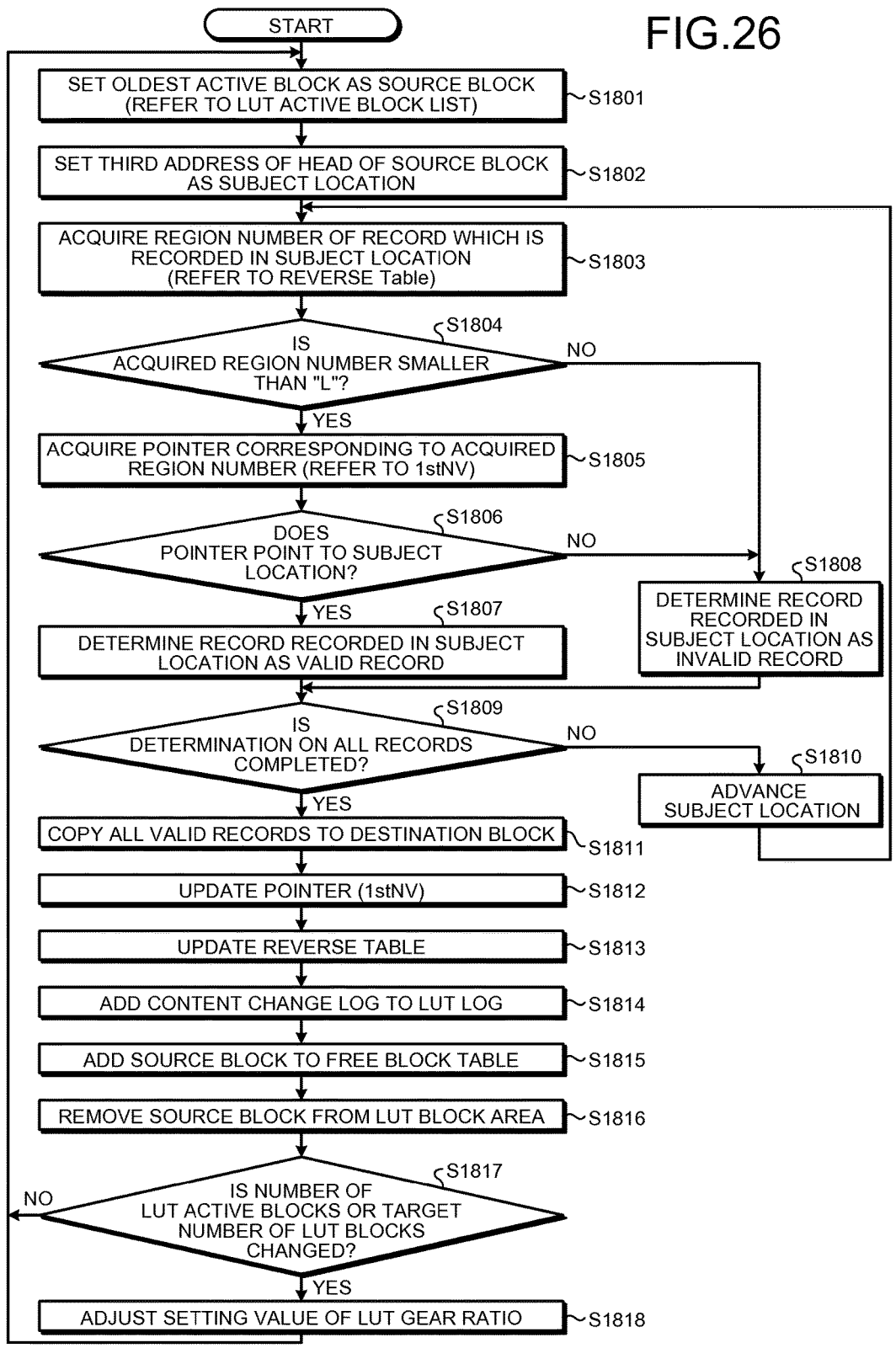
FIG. 26 is a flowchart for describing an LUT garbage collection.

FIG. 26 is a flowchart for describing the LUT garbage collection. First, the processing unit selects the oldest active block among the active blocks described in the LUT active block list 303 by referring to the LUT active block list 303, and sets the selected active block as the source block (S1801). The description "oldest active block" means the active block added to the LUT active block list 303 earliest among one or more blocks described in the LUT active block list 303. The processing unit sets the third address of the head of the source block as a subject location (S1802). The processing unit acquires the region number of the record recorded at the subject location by referring to the reverse table 311 (S1803). The processing unit determines whether the region number acquired by the process of S1802 is less than the table length "L" described in the table length setting value 306 (S1804).

In a case where the region number is less than "L" (Yes in S1804), the processing unit acquires a pointer corresponding to the region number acquired by the process of S1802 by referring to the 1stNV 309 (S1805). The processing unit determines whether the pointer acquired by the process of S1805 indicates the subject location (S1806). In a case where the pointer acquired by the process of S1805 indicates the subject location (Yes in S1806), the processing unit determines the record recorded at the subject location as a valid record (S1807). In a case where the region number acquired by the process of S1802 is not less than "L" (No in S1804), or a case where the pointer acquired by the process of S1805 does not illustrate the subject location (No in S1806), the processing unit determines the record recorded at the subject location is an invalid record (S1808).

After the process of S1807 or S1808, the processing unit determines whether all the records recorded in the source block are subjected to the process of determining the valid record or the invalid record (S1809). In a case where some records recorded in the source block are not subjected to the process of determining the valid record or the invalid record (No in S1809), the processing unit sets a location of the next record as a new subject location (S1810), and performs the process of S1803 again. In a case where all the records recorded in the source block are subjected to the process of determining the valid record or the invalid record (Yes in S1809), the processing unit copies all the valid records from the source block to the destination block (S1811). Then, the processing unit updates the pointer recorded in the 1stNV 309 (S1812), updates the reverse table 311 (S1813), and adds the content change log 202a to the LUT log 202 (S1814) in response to copying the valid record in the 2ndTable 204.

Subsequently, the processing unit adds the source block to the free block pool (S1815), and removes the source block from the LUT block area 29 (S1816). Specifically, in the process of S1816, the processing unit deletes the records of the source block from the LUT block information 302 and the LUT active block list 303.

Subsequently, the processing unit determines whether the number of LUT active blocks or the target number of LUT blocks 314 is changed after the process of S1817 at the last time (S1817). In a case where any one of the number of LUT active blocks and the target number of LUT blocks 314 is changed (Yes in S1817), the processing unit adjusts a setting value of the LUT gear ratio (S1818) based on a value obtained by subtracting the number of LUT active blocks from the target number of LUT blocks 314, and performs the process of S1801 again. The processing unit controls the execution of the LUT garbage collection such that the LUT gear ratio is matched with the setting value of the LUT gear ratio. In a case where the number of LUT active blocks and the target number of LUT blocks 314 both are unchanged (No in S1817), the processing unit skips the process of S1818.

Further, the description herein has been made about that the processing unit copies all the valid records included in the source block to the destination block. In a case where the region of the record determined as the valid record is cached, the processing unit may copy the record cached in the 2ndTableCache 310 to the destination block.

Figure 27:
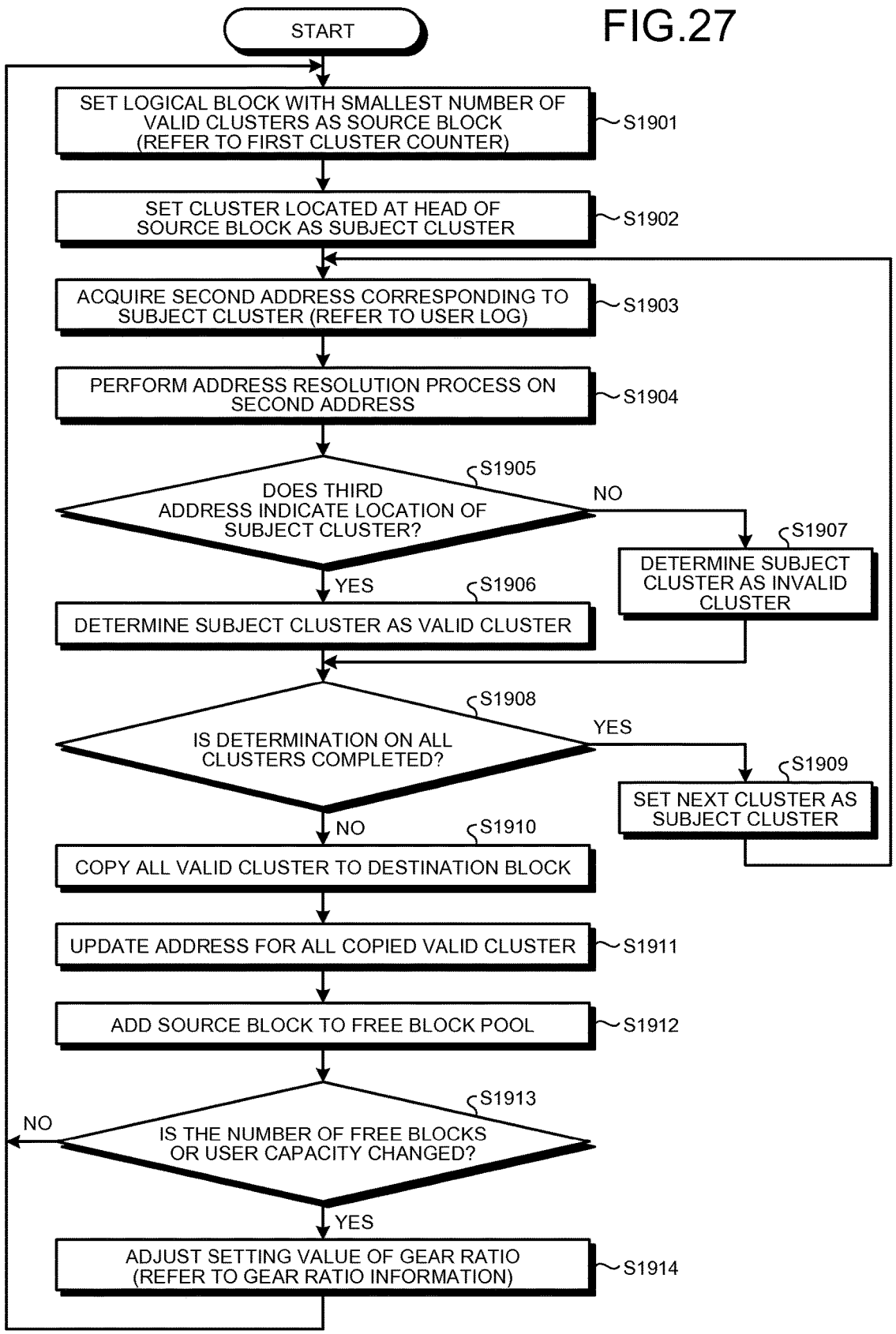
FIG. 27 is a flowchart for describing a user garbage collection.

FIG. 27 is a flowchart for describing the user garbage collection. The processing unit intermittently performs the user garbage collection in the middle of the control of the memory system 1. The processing unit controls the execution of the user garbage collection such that the gear ratio becomes equal to the setting value obtained from the gear ratio information 313. In addition, the processing unit dynamically controls the setting value of the gear ratio based on the number of free blocks and the user capacity.

First, by referring to the first cluster counter 304, the processing unit selects a logical block in which the number of valid clusters among one or more active blocks is minimum at a time when the first cluster counter 304 is referred, and sets the selected logical block as a source block (S1901). The processing unit sets a cluster located at the head of the source block as a subject cluster (S1902).

Subsequently, the processing unit acquires the second address corresponding to the subject cluster by referring to the user log 203 (S1903). The processing unit performs the address resolution process on the second address acquired by the process of S1903 (S1904). In a case where "INVALID" or "UNMAP" is acquired through the address resolution process, the processing unit performs the process of S1907 described below.

In a case where the third address is obtained through the address resolution process, the processing unit determines whether the third address indicates the location of the subject cluster (S1905). In a case where the third address obtained through the address resolution process indicates the location of the subject cluster (Yes in S1905), the processing unit determines the subject cluster as a valid cluster (S1906). In a case where the third address obtained through the process of S1904 does not indicate the location of the subject cluster (No in S1905), the processing unit determines the subject cluster as an invalid cluster (S1907). After the process of S1906 or S1907, the processing unit determines whether a cluster which is not set as the subject cluster is left in the source block (S1908). In a case where a cluster which is not set as the subject cluster yet is left in the source block (Yes in S1908), the processing unit selects the cluster which is not set as the subject cluster from the source block, and sets the selected cluster as a new subject cluster (S1909). After the process of S1909, the processing unit performs the process of S1903.

In a case where a cluster which is not set as the subject cluster is not left in the source block (No in S1908), the processing unit copies all the valid clusters from the source block to the destination block (S1910). The processing unit performs the address update process on all the copied valid clusters (S1911). The processing unit adds the source block to the free block pool (S1912).

Subsequently, the processing unit determines whether any one of the number of free blocks or the user capacity is changed (S1913). In a case where any one of the number of free blocks and the user capacity is changed (Yes in S1913), the processing unit adjusts the setting value of the gear ratio based on the number of free blocks and the user capacity and based on the gear ratio information 313 (S1914), and performs the process of S1901 again. In a case where neither the number of free blocks nor the user capacity is changed (No in S1913), the processing unit skips the process of S1914.

Figure 28:
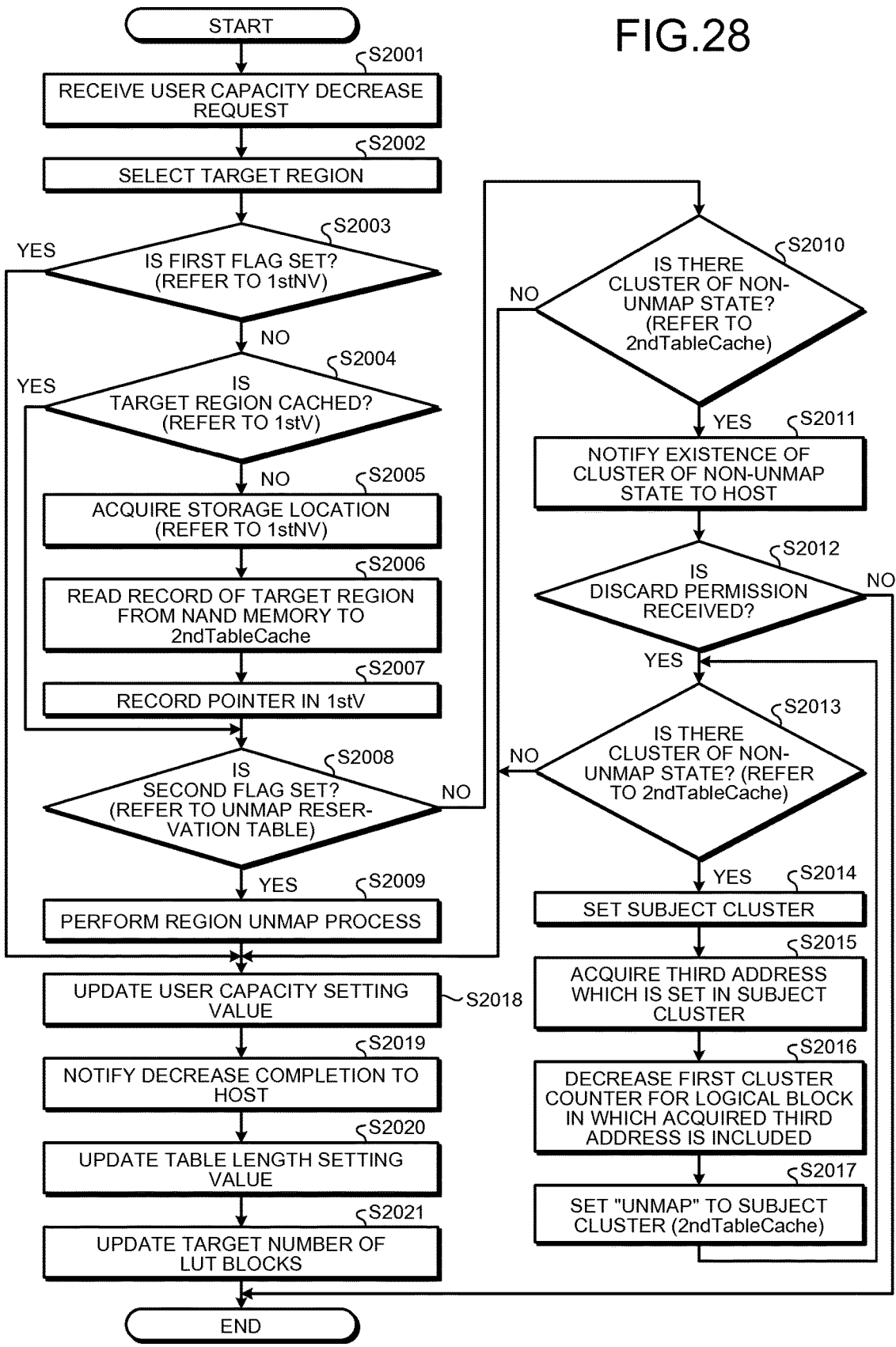
FIG. 28 is a flowchart for describing a capacity decrease process of the first embodiment.

FIG. 28 is a flowchart for describing a process of decreasing the user capacity (hereinafter, simply referred to as a "capacity decrease process"). Further, herein, when the user capacity is decreased, the storage area is sequentially removed from the end of the space of the first address region-by-region. When the user capacity is increased, the storage area is expanded from the end of the space of the first address region-by-region. In addition, for the sake of simplicity, the description herein will be made about a process of decreasing the user capacity only by a size of one region.

When receiving the user capacity decrease request from the host 2 (S2001), the processing unit selects a deletion target region (S2002). In the description of FIG. 28, deletion target region specified through the process of S2002 is denoted as a target region.

Subsequently, the processing unit determines whether the first flag is set for the target region by referring to the 1stNV 309 (S2003). In a case where the first flag is not set for the target region (No in S2003), the processing unit determines whether the target region is cached by referring to the 1stV 308 (S2004). In a case where the target region is not cached (No in S2004), the processing unit acquires the pointer indicating the location on the NAND memory 20 at which the record of the target region is stored by referring to the 1stNV 309 (S2005). Then, the processing unit reads the record of the target region from the location indicated by the acquired pointer to the 2ndTableCache 310 (S2006). In response to updating the 2ndTableCache 310 by the process of S2006, the processing unit records the 1stV 308 with the pointer indicating the location where the record of the target region is cached (S2007).

In a case where the target region has already been cached (Yes in S2004), or after the process of S2007, the processing unit determines whether the second flag is set for the target region by referring to the UNMAP reservation table 307 (S2008). In a case where the second flag is set for the target region (Yes in S2008), the processing unit performs the region UNMAP process on the target region (S2009).

In a case where the second flag is not set for the target region (No in S2008), the processing unit determines whether there is one or more clusters of the non-UNMAP state in the target region by referring to the 2ndTableCache 310 (S2010). In a case where there is one or more clusters in the non-UNMAP state in the target region (Yes in S2010), the processing unit notifies the existence of the cluster in the non-UNMAP state to the host 2 (S2011).

After the process of S2011, the processing unit waits for receiving discard permission from the host 2. In a case where the processing unit receives the discard permission (Yes in S2012), the processing unit performs the same processes as those of S1401 to S1405 in S2013 to S2017 so as to set the states of all the clusters in the target region to the UNMAP state.

In a case where the first flag is set for the target region (Yes in S2003), or after the process of S2009, or in a case where all the clusters present in the target region are in the UNMAP state (No in S2010), or in a case where all the clusters present in the target region are in the UNMAP state (No in S2013), the processing unit updates the user capacity setting value 305 such that the user capacity is decreased by a size of the target region (S2018), and notifies a decrease completion to the host 2 (S2019).

In addition, the processing unit updates the table length setting value 306 (S2020). In the process of S2020, the processing unit updates the table length setting value 306 such that the value is decreased by one record. Through this process, the record (that is, the record which is recorded in the end of each table) of the target region which is recorded in the 1stV 308 and the 1stNV 309 is deleted from a management target. Herein, the management in the 1stV 308 and the 1stNV 309 includes at least operating situationally, to the 1stV 308 and the 1stNV 309, updating or referring to.

Subsequently, the processing unit updates the target number of LUT blocks 314 (S2021). In the process of S2021, the processing unit decreases the target number of LUT blocks 314 by the size of one region from the value before the updating. After the process of S2021, the processing unit ends the operation.

In a case where the discard permission is not received from the host 2 (No in S2012), the processing unit ends the operation.

Further, the description herein has been made about the process of decreasing the user capacity by the size of one region. However, in a case where the user capacity is required to be decreased by the size of a plurality of regions, the processes of S2002 to S2021 are repeatedly performed by a region, for example.

Figure 29:
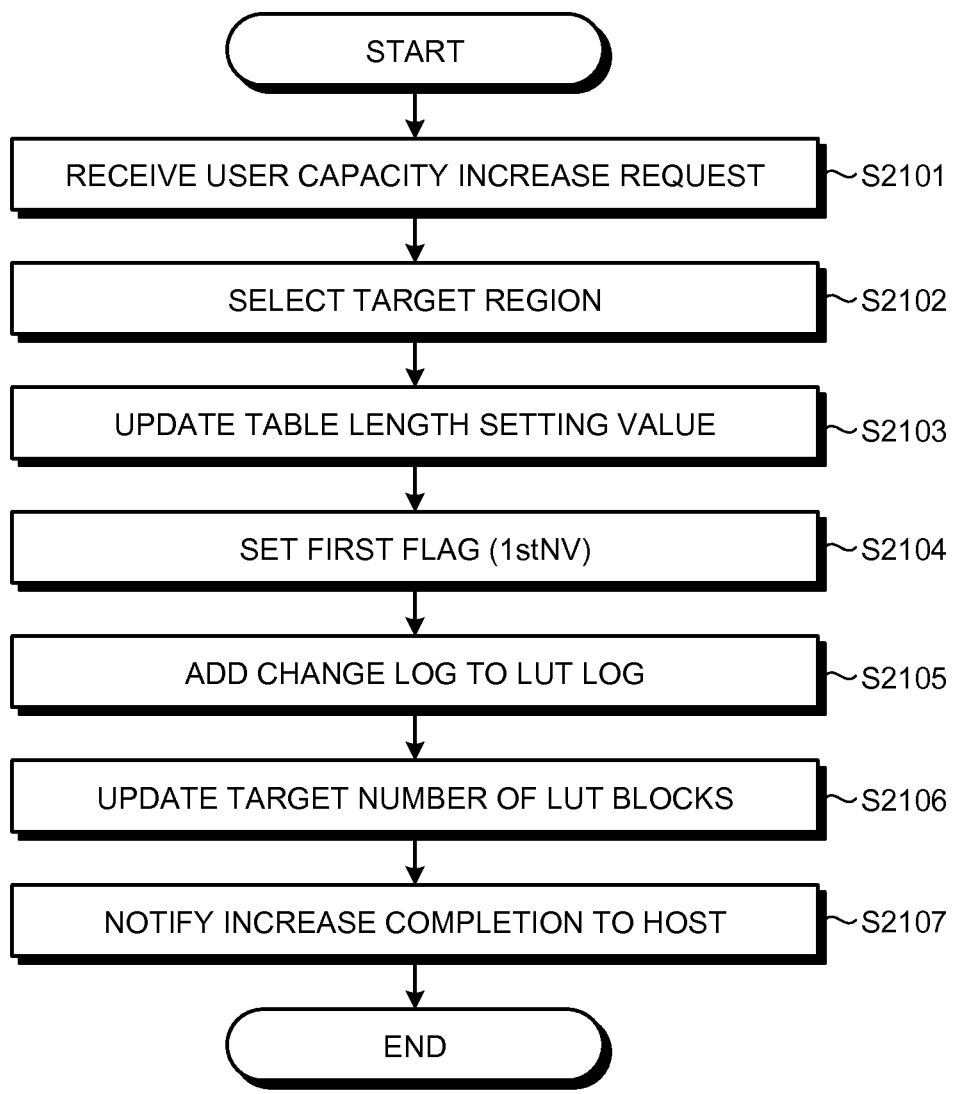
FIG. 29 is a flowchart for describing a foreground process in a capacity increase process.

FIG. 29 is a flowchart for describing a process of increasing the user capacity (hereinafter, referred to as a "capacity increase process"). For the sake of simplicity, the description herein will be made about a process of increasing the user capacity by the size of one region.

When receiving the user capacity increase request from the host 2 (S2101), the processing unit selects a region to be added (S2102). In the description of FIG. 29, the region selected through the process of S2102 is denoted as a target region.

The processing unit updates the table length setting value 306 (S2103). In the process of S2103, the processing unit updates the table length setting value 306 such that the value is increased by one record. Through this process, the record for the target region is added as the management target to the end of the 1stV 308 and the end of the 1stNV 309. The data item of each added record is empty. For example, an initial value is recorded in each added record of the 1stNV 309. The initial value is a magic number which is regarded as an invalid value. The processing unit sets the first flag for the record of the target region which is added to the 1stNV 309 (S2104). The processing unit adds the size change log 202*b* to the LUT log 202 (S2105).

Subsequently, the processing unit updates the target number of LUT blocks 314 (S2106). In the process of S2106, the processing unit increases the target number of LUT blocks 314 by the size of one region to the value before the updating. The processing unit notifies an increase completion to the host 2 (S2107). After the process of S2107, the processing unit ends the operation.

Further, the description herein has been made about the process of increasing the user capacity by the size of one region. However, in a case where the user capacity is required to be increased by the size of a plurality of regions, the processing unit collectively performs the respective processes of S2102 to S2106 on all the addition target regions, for example. Thereafter, the processing unit performs the process of S2107 only by one time.

As described above, according to the first embodiment, the memory system 1 includes the available area 28 in which the user data 205 is stored. The size (the second size) of the available area 28 is larger than the user capacity (the first size). The processing unit can change the user capacity in response to the request from the host 2 (the user capacity decrease request, the user capacity increase request) while the user data 205 indicated by at least a part of the logical address space is held in the available area 28.

More specifically, according to the capacity decrease process illustrated in FIG. 28, the region which is not the deletion target in the logical address space is not changed in the correspondence relation between the second address and the third address. Therefore, the processing unit performs the capacity decrease process while the user data 205 stored with designation of the region which is not the deletion target in the logical address space is maintained in a valid state. In this regard, in a case where there is the user data 205 stored with designation of the deletion target region, the processing unit sets the user data 205 stored with designation with the deletion target region to the UNMAP state through the processes of S2013 to S2017 after the discard permission is received (Yes in S2012). Furthermore, the processing unit, through the updating (S2020) of the table length setting value 306, removes the deletion target region from the management target in the 1stV 308 and the 1stNV 309. In a case where the address resolution process is performed on the region removed from the management target, the processing unit acquires a result of "INVALID" (S1510). Herein, the management in the logical address space includes at least operating situationally, to the logical address space, reading the user data 205, writing the user data 205, or the UNMAP process in the logical address space. The management in data includes at least operating situationally, to the location storing the data therein, reading, writing, or the UNMAP process. Since "INVALID" is acquired through the address resolution process (S1904) in the user garbage collection (FIG. 27), the processing unit determines that the state of the user data 205 stored with designation of the region deleted from the management target is in the invalid state (S1907). The processing unit erases the source block without copying the user data 205 of the invalid state from the source block to the destination block. In this way, in a case where there is the user data 205 which is valid in the region which is not the deletion target and in the region of the deletion target, the processing unit does not invalidate the user data 205 stored with designation of the region which is not the deletion target, but invalidates the user data 205 stored with designation of the region of the deletion target after the discard permission is received. In other words, the processing unit can decrease the user capacity while the user data 205 indicated by at least a part of the logical address space is maintained valid. In other words, the processing unit can decrease the user capacity while keeping the management on at least a part of data (the valid data) in the logical address space. In other words, the processing unit can decrease the user capacity while at least a part of data in the logical address space stays valid.

In addition, according to the capacity increase process illustrated in FIG. 29, the existing region in the logical address space is unchanged in the correspondence relation between the second address and the third address. Therefore, the processing unit performs the capacity increase process while keeping the valid state of the user data 205 stored with designation of the existing region in the logical address space. In other words, the processing unit can increase the user capacity while the user data 205 stored with designation of the existing region in the logical address space is maintained.

In a case where there is the user data 205 stored with designation of the deletion target region, the processing unit gives warning to the host 2 before the record is deleted. Therefore, it is possible to prevent an event in which the valid user data 205 is invalidated through the capacity decrease process without warning to the host 2.

Further, the processing unit may be configured to, in a case where there is the user data 205 stored with designation of the region of the deletion target, abort the process without warning to the host 2. In addition, the processing unit may be configured to, in a case where there is the user data 205 stored with designation of the deletion target region, give warning to the host 2, and continue capacity decrease process regardless of whether the discard permission is received. In addition, the processing unit may give warning to the host 2 after the capacity decrease process.

The memory system 1 stores therein the first level of the hierarchy (the 1stV 308 and the 1stNV 309) and the second level of the hierarchy (the 2ndTableCache 310 and the 2ndTable 204) as correspondence information which associates the second address and the third address. The processing unit changes the number of records which associates the second address and the third address included in the correspondence information in response to the request from the host 2 (the user capacity decrease request, the user capacity increase request).

More specifically, in a case where the memory system 1 receives the user capacity decrease request, the processing unit sets "UNMAP" to all the clusters in the records of the second hierarchical table for the region of the deletion target (S2003 to S2017). Then, the processing unit deletes the record from the first hierarchical table for the deletion target region (S2020). Since the record of the deletion target region in the second hierarchical table is not pointed from the first hierarchical table, the processing unit determines the record of the deletion target region in the 2ndTable 204 as an invalid record in the LUT garbage collection (S1807). The processing unit erases the source block without copying the invalid record from the source block to the destination block. Further, the record of the deletion target region in the 2ndTableCache 310 may be set as the target of the non-volatilization, or may be not set as the target of the non-volatilization. Even in a case where the record of the deletion target region in the 2ndTableCache 310 is subjected to the non-volatilization, the record is deleted through the LUT garbage collection after the non-volatilization. Therefore, the deletion target record in the second level of the hierarchy is also deleted in response to the deletion of the record from the first level of the hierarchy.

In addition, in a case where the memory system 1 receives the user capacity increase request, the processing unit adds the record to the 1stV 308 and the 1stNV 309 (S2103). Then, the processing unit sets the first flag for the record added in the 1stNV 309 (S2104). Further, regarding the second level of the hierarchy, the processing unit generates the record of the target region of the addition in the 2ndTableCache 310 upon the address update process (S1603), and sets the generated record as the target of the non-volatilization (S1616). Therefore, in a case where the user capacity increase request is received, the processing unit adds the record to each of the first level of the hierarchy and the second level of the hierarchy.

Further, the process of adding the record of the target region for addition to the second level of the hierarchy can be performed at any timing. The above description has been made about that the processing unit acquires the result "UNMAP" without generating the corresponding record in the 2ndTableCache 310 when the address resolution process is performed on the region in a state where the first flag is set (S1511). The processing unit may generate the corresponding record in the 2ndTableCache 310 by performing the same process as that of S1603 in the address update process even in the address resolution process.

In addition, the above description has been made about that the number of records in the first level of the hierarchy and the number of records in the second level of the hierarchy both are changed, but only the number of records in any one of these tables may be changed. In other words, the information including at least one of the logical address and the physical address among the information stored as the correspondence information by the memory system 1 belongs to the concept of the record which is the target to change the number in this embodiment.

In addition, in a case where the processing unit performs the address update process, the processing unit generates the record of the second hierarchical table through a process performed during the address update process, and resets the first flag (S1605). Further, even in a case where the processing unit performs the address resolution process, the processing unit may generate the record of the second level of the hierarchy.

In addition, the processing unit cares each cluster about whether the cluster is in the UNMAP state or the non-UNMAP state. Herein, the processing unit realizes the management on whether each cluster is in the UNMAP state or the non-UNMAP state by setting each data item of the 2ndTable 204 to "UNMAP" or any value of the third address. The processing unit may record whether each cluster is in the UNMAP state or the non-UNMAP state in another table other than the 2ndTable 204.

In addition, the processing unit intermittently performs the user garbage collection in the middle of the control of the memory system 1. The processing unit controls the execution of the user garbage collection such that the gear ratio becomes equal to the setting value obtained from the gear ratio information 313. In addition, the processing unit dynamically controls the setting value of the gear ratio based on at least one of the number of free blocks and the user capacity. Specifically, the processing unit monitors the user capacity setting value 305 and the number of free blocks (S1913). The processing unit calculates the setting value of the gear ratio by applying the user capacity setting value 305 and the number of free blocks to the gear ratio information 313 described with reference to FIGS. 17 and 18, and applies the calculated setting value of the gear ratio (S1914). Then, the processing unit adjusts the execution of the user garbage collection such that the gear ratio becomes equal to the setting value.

A relation between the number of free blocks and the setting value of the gear ratio can be defined in any manner. For example, the relation between the number of free blocks and the setting value of the gear ratio is defined in advance such that the setting value of the gear ratio is higher in a case where the number of free blocks is a first value than the setting value of the gear ratio in a case where the number of free blocks is a second value. The second value is a value larger than the first value.

In addition, the relation between the user capacity and the setting value of the gear ratio can be defined in any manner. For example, the relation between the user capacity and the setting value of the gear ratio is defined in advance such that the setting value of the gear ratio is higher in a case where the user capacity is a third value than the setting value of the gear ratio in a case where the user capacity is a fourth value. The fourth value is a value smaller than the third value. Alternatively, the relation between the over-provisioning percentage and the setting value of the gear ratio is defined in advance such that the setting value of the gear ratio is higher in a case where the over-provisioning percentage is a fifth value than the setting value of the gear ratio in a case where the over-provisioning percentage is a sixth value. The sixth value is a value larger than the fifth value. Further, the over-provisioning percentage is a value obtained by dividing the over-provisioning capacity by the user capacity.

Further, the processing unit may perform control even on the LUT garbage collection.

In addition, the description has been made about that the processing unit does not begin the UNMAP process in units of a region in response to the UNMAP request from the host 2 immediately after the UNMAP request is received, but performs any one of the address resolution process, the address update process, the capacity decrease process, or the user garbage collection. The processing unit may perform the UNMAP process in units of a region in response to the UNMAP request from the host 2 immediately after the UNMAP request is received.

In addition, the description has been made about that the 1stNV 309 is recovered in the power-on sequence. The 1stNV 309 may be saved from the RAM 30 in the system area 27 in the power-off sequence, and loaded from the system area 27 to the RAM 30 in the power-on sequence. In this case, the LUT log 202 is not necessary.

In addition, the description has been made about that the processing unit records the size change log 202b at the time of the capacity increase process, does not record the size change log 202b at the time of the capacity decrease process. However, the processing unit may record the size change log 202b at any time of the capacity increase process and the capacity decrease process. In a case where the processing unit records the size change log 202b at both of the capacity increase process and the capacity decrease process, the recovery of the 1stNV 309 is possible based only on the LUT log 202, thereby the table length setting value 306 is not necessarily saved in the power-off sequence.

(Second Embodiment)

Figure 30:
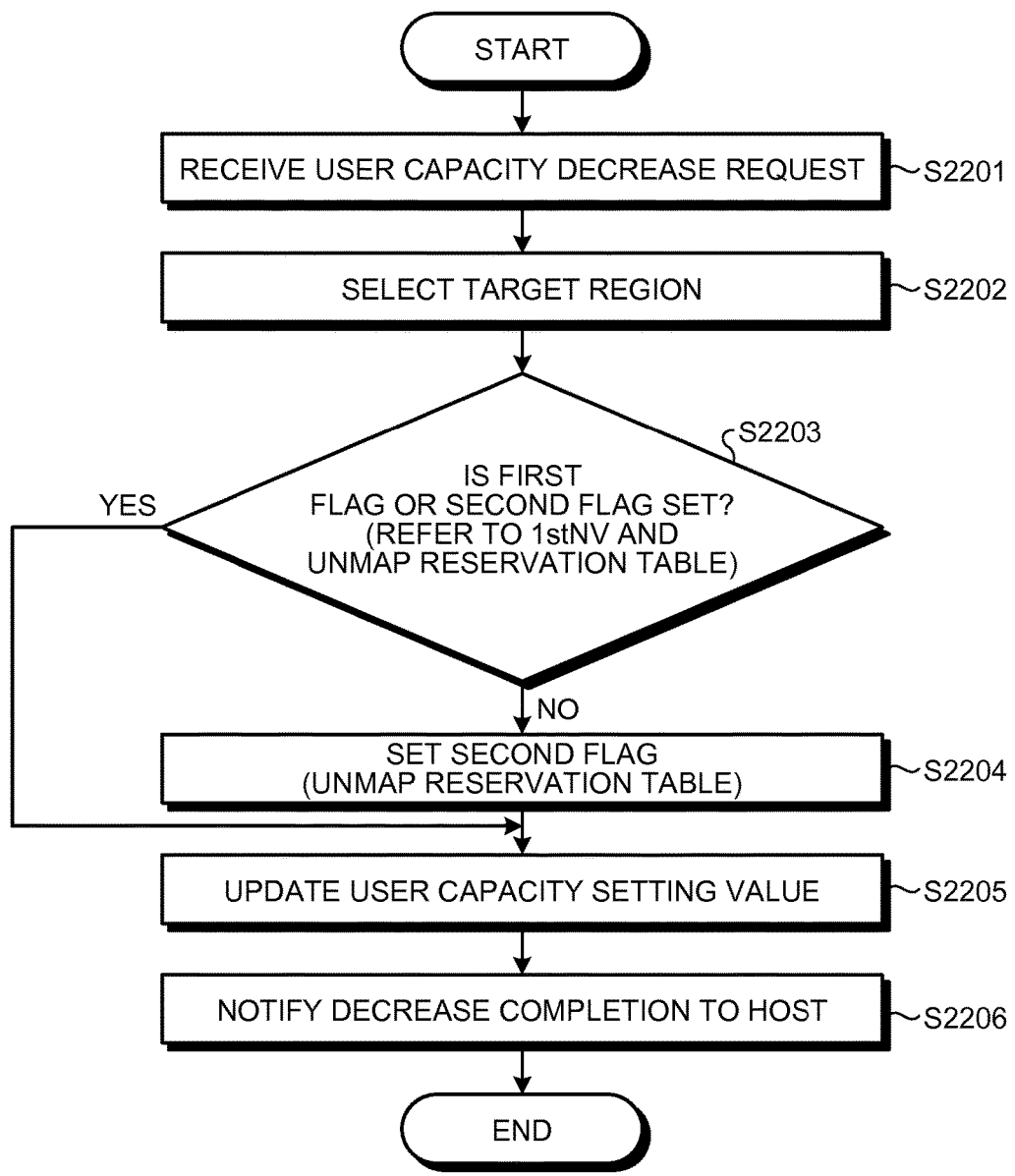
FIG. 30 is a flowchart for describing a capacity decrease process of a second embodiment.
Figure 31:
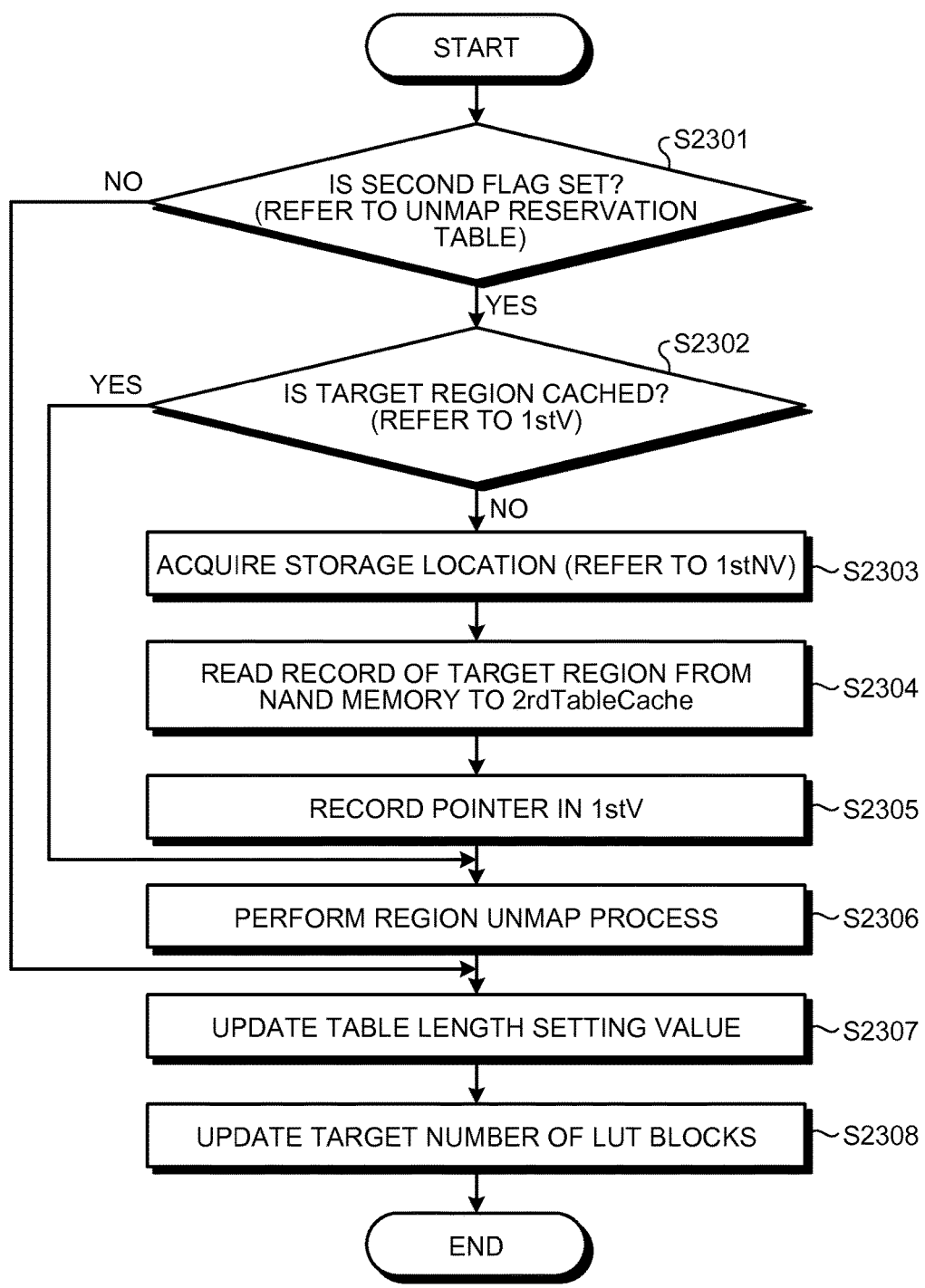
FIG. 31 is a flowchart for describing a background process in the capacity decrease process of the second embodiment.

FIGS. 30 and 31 are flowcharts for describing a capacity decrease process of a second embodiment. In the second embodiment, the capacity decrease process is divided into the response process (a foreground process) to the host 2 and an inner process (a background process) after the response process. FIG. 30 is a flowchart for describing the foreground process, and FIG. 31 is a flowchart for describing the background process. Herein, for the sake of simplicity, the description will be made about a process of decreasing the user capacity by the size of one region.

When the processing unit receives the user capacity decrease request from the host 2 (S2201), the processing unit selects a deletion target region (S2202). In the description of FIGS. 30 and 31, the deletion target region selected through the process of S2202 is denoted as a target region.

Subsequently, the processing unit determines whether any of the first flag and the second flag is set for the target region by referring to the 1stNV 309 and the UNMAP reservation table 307 (S2203). In a case where neither the first flag nor the second flag is set for the target region (No in S2203), the processing unit sets the second flag for the target region (S2204), and updates the user capacity setting value 305 (S2205). Then, the processing unit notifies the decrease completion to the host 2 (S2206). After the process of S2206, the processing unit ends the foreground process. In a case where any of the first flag and the second flag is set for the target region (Yes in S2203), the processing unit skips the process of S2204.

In the background process, the processing unit determines whether the second flag is set for the target region by referring to the UNMAP reservation table 307 (S2301). In a case where the second flag is set for the target region (Yes in S2301), the processing unit determines whether the target region is cached by referring to the 1stV 308 (S2302). In a case where the target region is not cached (No in S2302), the processing unit acquires the pointer indicating the location on the NAND memory 20 at which the record of the target region is stored by referring to the 1stNV 309 (S2303). Then, the processing unit reads the record of the target region from the location indicated by the acquired pointer to the 2ndTableCache 310 (S2304). The processing unit records the pointer indicating the location at which the record of the target region is cached in the 1stV 308 in response to the updating of the 2ndTableCache 310 through the process of S2303 (S2305).

In a case where the target region is cached (Yes in S2302), or after the process of S2211, the processing unit performs a region UNMAP process on the target region (S2306).

In a case where the second flag is not set for the target region (No in S2301), or after the process of S2306, the processing unit updates the table length setting value 306 (S2307). Then, the processing unit updates the target number of LUT blocks 314 (S2308), and ends the background process.

In this way, in the second embodiment, in a case where the memory system 1 receives the user capacity decrease request, the processing unit sets the second flag for the region of the deletion target before the determination on whether there is a cluster of the non-UNMAP state in the region of the deletion target, and notifies the decrease completion to the host 2. The processing unit performs the UNMAP process on the deletion target region in a state where the second flag is set after the notification of the decrease completion, and then deletes the record of the deletion target region. According to the second embodiment, the memory system 1 can transmit the notification of the decrease completion earlier than the first embodiment.

(Third Embodiment)

In a third embodiment, the processing unit manages the number of clusters of the non-UNMAP state for each storage area of a predetermined size in the space of the first address. The unit of management on the number of clusters of the non-UNMAP state may be a region or may be not a region. Herein, as an example, the processing unit manages the number of clusters in the non-UNMAP state by units of area (a region group) composed of 1024 regions.

Figures 32, 33:
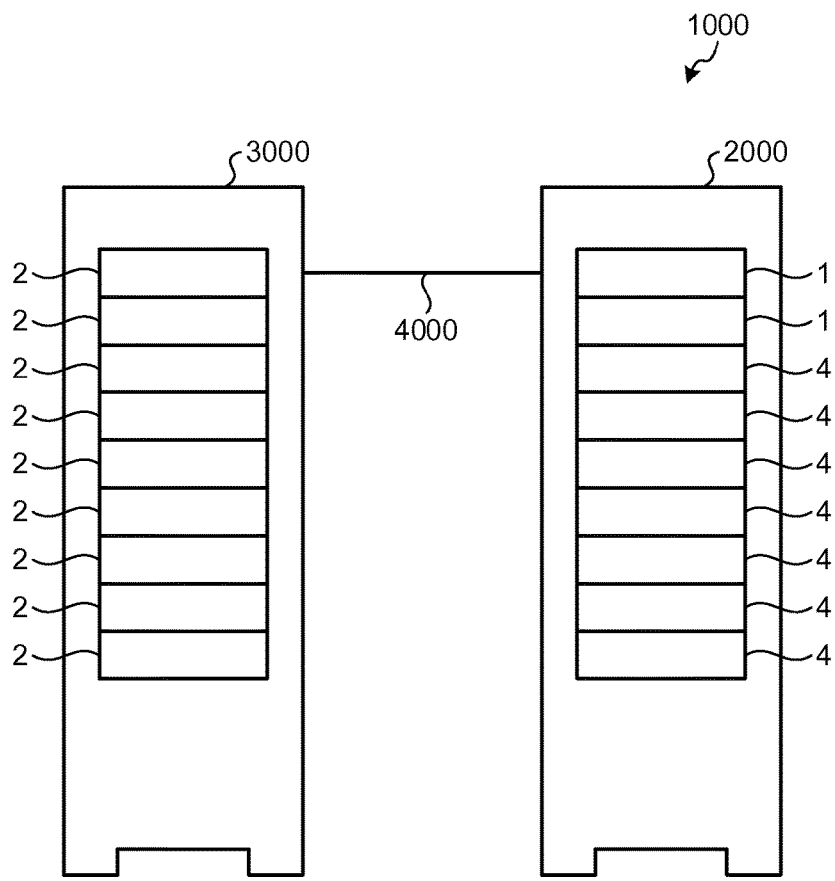
FIG. 32 is a diagram illustrating an exemplary data structure of a second cluster counter.
FIG. 33 is a diagram illustrating an exemplary implementation of the memory system.

The processing unit manages a second cluster counter. FIG. 32 is a diagram illustrating an exemplary data structure of the second cluster counter. As illustrated in the drawing, a second cluster counter 315 is recorded with the number of clusters in the non-UNMAP state for each region group. The processing unit stores the second cluster counter 315 in the RAM 30, and updates or refers the second cluster counter 315 stored in the RAM 30. The processing unit saves the second cluster counter 315 from the RAM 30 into the system area 27 in the power-off sequence, and loads the second cluster counter from the system area 27 into the RAM 30 in the power-on sequence.

The processing unit updates the second cluster counter 315 as described below. In a case where the third address is set to the cluster of the UNMAP state in the 2ndTableCache 310, the processing unit increases a value recorded in the second cluster counter 315 for the region group belonging to the cluster. In addition, in a case where "UNMAP" is set to the cluster set with the third address in the 2ndTableCache 310, the processing unit decreases the value recorded in the second cluster counter 315 for the region group belonging to the cluster. In addition, in a case where, to the cluster set with the third address in the 2ndTableCache 310, another third address is set, the processing unit does not update the second cluster counter 315. In addition, when "UNMAP" is set to the cluster set with "UNMAP" in the 2ndTableCache 310, the processing unit does not update the second cluster counter 315.

The processing unit refers the second cluster counter 315 at the time of the capacity decrease process. In a case where decreasing in units of a region group is required by the user capacity decrease request, the processing unit determines whether there is the cluster in the non-UNMAP state in the region group which is a deletion target by referring to the second cluster counter 315 before the determination whether the first flag is set or not (S2003). In a case where there is no cluster in the non-UNMAP state in the deletion target, the confirmation on whether there is no cluster in the non-UNMAP state in the deletion target is completed without the confirmation (S2010) in units of a cluster in a case where the first flag is not set. Therefore, the confirmation on whether there is no cluster in the non-UNMAP state in the deletion target is performed at a speed higher than the first embodiment.

Further, even in a case where the decrease in units of a region or in units of a cluster is required, the confirmation on whether there is no cluster in the non-UNMAP state in the deletion target may be performed by the processing unit by referring to the second cluster counter 315.

(Fourth Embodiment)

FIG. 33 is a diagram illustrating an exemplary implementation of the memory system 1. The memory system 1, for example, is installed in a server system 1000. The server system 1000 is configured to include a disk array 2000 and a rack-mount server 3000 which are connected through a communication interface 4000. As a standard of the communication interface 4000, any standard may be employed. The rack-mount server 3000 is configured to include one or more hosts 2 in a server rack. A plurality of hosts 2 can make access to the disk array 2000 through the communication interface 4000.

In addition, the disk array 2000 is configured to have a structure of a server rack, and include one or more memory systems 1 and one or more hard disk units 4 in the server rack. Each memory system 1 can perform the read command from each host 2. In addition, each memory system 1 has the configurations employed in the first to third embodiments. With this configuration, in a case where a request for changing the user capacity from any one of the plurality of hosts 2 is issued, each memory system 1 can dynamically change the user capacity.

Further, in the disk array 2000, for example, each memory system 1 may be used as a cache of one or more hard disk units 4. The disk array 2000 may be mounted with a storage controller unit which establishes RAID in one or more hard disk units 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first storage area configured to store therein data received from a host, a size of the first storage area being a first size larger than a second size, the second size being a size of a logical address space which is assigned to the memory system by the host;
a second storage area configured to store therein first correspondence information which includes second correspondence information and one or more pieces of third correspondence information, the second correspondence information including one or more first records, each of the one or more pieces of third correspondence information indicating a physical address in the first storage area, each of the one or more first records associates a logical address in the logical address space with a pointer which points to corresponding information among the one or more pieces of third correspondence information; and
a controller configured to change the second size in response to a request from the host while at least a part of data in the logical address space stays valid, wherein
the controller adds a second record to the second correspondence information in response to a first request, and deletes a third record from the second correspondence information in response to a second request,
the first request is a request for increasing the second size,
the second request is a request for decreasing the second size,
the second record is a first record corresponding to a first logical address space which is added according to the increase of the second size, and
the third record is a first record corresponding to a second logical address space which is deleted according to the decrease of the second size.

2. The memory system according to claim 1, wherein
the controller is configured to
add the second record to the second correspondence information,
set a first flag of the added second record, and
in a case of attempting to access a logical space of the first logical address space corresponding to the added second record, generate a new piece of third correspondence information which indicates a physical address of a destination of the access, records a pointer which points to the new piece of third correspondence information in the added second record, and resets the first flag of the added second record.

3. The memory system according to claim 1, wherein
each of the one or more first records included in the second correspondence information corresponds to an area in a first unit in the logical address space,
each of the one or more pieces of third correspondence information indicates a plurality of physical addresses,
each of the plurality of physical addresses corresponds to an area in a second unit in the logical address space,
the area in the second unit is smaller than the area in the first unit,
the controller is configured to
check whether a state of an area in the second unit in the second logical address space is a first state or a second state, the first state being a state in which a logical address of the area in the second unit is associated with a physical address, the second state being a state in which the logical address of the area in the second unit is associated with no physical addresses,
in a case where the second request is received, determine whether there is a first area in the second logical address space,
and in a case where there is the first area in the second logical address space, warn the host,
the first area being an area in the second unit in the first state.

4. The memory system according to claim 3,
wherein the controller is configured to delete the third record after the warning to the host.

5. The memory system according to claim 3,
wherein the controller is configured to delete the third record in a case where a permission is received after the warning to the host.

6. The memory system according to claim 5,
wherein the controller does not delete the third record in a case where the permission is not received after the warning to the host.

7. The memory system according to claim 5,
wherein the controller is configured to
in a case where the second request is received,
set a second flag of an area in the first unit included in the second logical address space before performing the determination process to check whether there is the first area in the second logical address space, and then notify the host of a completion response to the received second request, and
after the notification of the completion response, start the determination process on the area in the first unit of which the second flag is set.

8. The memory system according to claim 1,
wherein
each of the one or more first records included in the second correspondence information corresponds to an area in a first unit in the logical address space,
each of the one or more pieces of third correspondence information indicates a plurality of physical addresses,
each of the plurality of physical addresses corresponds to an area in a second unit in the logical address space,
the area in the second unit is smaller than the area in the first unit, and
the controller is configured to
check whether a state of an area in the second unit in the second logical address space is a first state or a second state, the first state being a state in which a logical address of the area in the second unit is associated with a physical address, the second state being a state in which the logical address of the area in the second unit is associated with no physical addresses,
in a case where the second request is received, determine whether there is a first area in the second logical address space,
and in a case where there is the first area in the second logical address space, abort processing the second request,
the first area being an area in the second unit in the first state.

9. The memory system according to claim 1,
wherein
each of the one or more first records included in the second correspondence information corresponds to an area in a first unit in the logical address space,
each of the one or more pieces of third correspondence information indicates a plurality of physical addresses, each of the plurality of physical addresses corresponds to an area in a second unit in the logical address space,
the area in the second unit is smaller than the area in the first unit, and
the controller is configured to
check whether a state of an area in the second unit in the second logical address space is a first state or a second state, the first state being a state in which a logical address of the area in the second unit is associated with a physical address, the second state being a state in which the logical address of the area in the second unit is associated with no physical addresses,
in a case where the second request is received, determine whether there is a first area in the second logical address space, the first area being an area in the second unit in the first state,
in a case where there is the first area in the second logical address space, records information indicating the second state in a piece of third correspondence information corresponding to the first area and delete the third record, and
in a case where there is no first area in the second logical address space, deletes the third record without updating a piece of third correspondence information corresponding to the first area.

10. The memory system according to claim 1,
wherein the first storage area includes a plurality of blocks, and
the controller is configured to
write data received from the host in an empty area of a first block, the first block being a block having the empty area among the plurality of blocks,
in a case where two pieces of data designated to a same first logical address are stored in the first storage area, and in a case where the two pieces of data are stored at locations indicated by different physical addresses, regard one of the two pieces of data stored at a location indicated by a physical address associated with the first logical address by the first correspondence information as valid data, and regard the other of the two pieces of data stored at a location indicated by a physical address not associated with the first logical address by the first correspondence information as invalid data,
perform a garbage collection in which a second block is selected from the plurality of blocks, valid data among data stored in the second block is copied to an empty area of a third block, the third block being a block having the empty area among the plurality of blocks, and the second block is set as a free block after the copying,
erase all the data stored in the free block after the garbage collection, and
control a ratio of an amount of the data to be written to the third block by the garbage collection to an amount of the data from the host to be written to the first block according to a number of free blocks, the first size and the second size.

11. The memory system according to claim 10,
wherein the controller is configured to
make the ratio higher in a case where the number of free blocks is a first value than the ratio in a case where the number of free blocks is a second value, the second value being larger than the first value.

12. The memory system according to claim 10,
wherein the controller is configured to make the ratio higher in a case where the second size is a first value than the ratio in a case where the second size is a second value, the second value being smaller than the first value.

13. The memory system according to claim 10,
wherein the controller is configured to
make the ratio higher in a case where a percentage of a value obtained by subtracting the second size from the first size with respect to the second size is a first value than the ratio in a case where the percentage is a second value, the second value being larger than the first value.

14. The memory system according to claim 10,
wherein the controller tracks an amount of valid data for each block, and selects a block having a minimum amount of valid data from among the plurality of blocks as the second block.

15. The memory system according to claim 14,
wherein
each of the one or more first records included in the second correspondence information corresponds to an area in a first unit in the logical address space,
each of the one or more pieces of third correspondence information indicates a plurality of physical addresses,
each of the plurality of physical addresses corresponds to an area in a second unit in the logical address space,
the area in the second unit is smaller than the area in the first unit, and
the controller is configured to
check whether a state of an area in the second unit in the second logical address space is a first state or a second state, the first state being a state in which a logical address of the area in the second unit is associated with a physical address, the second state being a state in which the logical address of the area in the second unit is associated with no physical addresses,
determine whether there is a first area in the second logical address space in a case where the second request is received, the first area being an area in the second unit in the first state, and
in a case where there is the first area in the second logical address space, acquire a physical address corresponding to a logical address indicating the first area by referring to the first correspondence information, decrease a tracked value of an amount of valid data in a block to which the acquired physical address belongs among the plurality of blocks, and delete the third record.

* * * * *